United States Patent
Kaneko et al.

(10) Patent No.: US 11,631,428 B2
(45) Date of Patent: *Apr. 18, 2023

(54) MAGNETIC TAPE CARTRIDGE AND MAGNETIC TAPE APPARATUS

(71) Applicant: FUJIFILM Corporation, Tokyo (JP)

(72) Inventors: Yusuke Kaneko, Kanagawa (JP); Norihito Kasada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/378,782

(22) Filed: Jul. 19, 2021

(65) Prior Publication Data

US 2022/0028421 A1   Jan. 27, 2022

(30) Foreign Application Priority Data

Jul. 21, 2020   (JP) .............................. JP2020-124710

(51) Int. Cl.
| | |
|---|---|
| *G11B 23/08* | (2006.01) |
| *G11B 5/73* | (2006.01) |
| *G11B 5/733* | (2006.01) |
| *G11B 5/78* | (2006.01) |
| *G11B 23/107* | (2006.01) |

(52) U.S. Cl.
CPC ........ *G11B 5/73913* (2019.05); *G11B 5/7334* (2019.05); *G11B 5/73927* (2019.05); *G11B 5/78* (2013.01); *G11B 23/08* (2013.01); *G11B 23/107* (2013.01)

(58) Field of Classification Search
None
See application file for complete search history.

(56) References Cited

U.S. PATENT DOCUMENTS

| | | | |
|---|---|---|---|
| 5,195,689 A | * 3/1993 | Beer | ...... B42C 9/0062 242/588.6 |
| 6,515,827 B1 | * 2/2003 | Raymond | .............. G11B 23/04 242/348.2 |
| 9,311,946 B2 | 4/2016 | Tanaka et al. | |
| 9,767,835 B2 | 9/2017 | Tanaka et al. | |

(Continued)

FOREIGN PATENT DOCUMENTS

| | | | |
|---|---|---|---|
| JP | 2007-179680 | * | 7/2007 |
| JP | 2010-218651 | * | 9/2010 |
| JP | 2012043495 | | 3/2012 |

OTHER PUBLICATIONS

Non-Final Office Action dated Mar. 3, 2022 in co-pending U.S. Appl. No. 17/378,783.

(Continued)

*Primary Examiner* — Brian E Miller
(74) *Attorney, Agent, or Firm* — Sughrue Mion, PLLC

(57) ABSTRACT

The magnetic tape cartridge includes a magnetic tape that is accommodated in the magnetic tape cartridge while being wound around a reel hub. A water absorption amount of the magnetic tape measured after the magnetic tape cartridge is stored in a storage environment of a temperature of 32° C. and a relative humidity of 80% for 10 days is 0.30 g or less as a value in terms of a length of the magnetic tape of 1000 m, and the water absorption amount is a value measured in a measurement environment with a temperature of 21° C. and a relative humidity of 50% within 1 hour after the storage.

14 Claims, 2 Drawing Sheets

(56) References Cited

U.S. PATENT DOCUMENTS

| | | | | |
|---|---|---|---|---|
| 2001/0008714 A1* | 7/2001 | Sueoka | ............... | G11B 5/7356 |
| 2006/0208122 A1* | 9/2006 | Sogabe | ............... | G11B 23/107 |
| | | | | 242/348 |
| 2008/0259495 A1* | 10/2008 | Ichikawa | ............. | G11B 23/037 |
| 2020/0342903 A1* | 10/2020 | Kasada | .................... | G01B 9/02 |
| 2020/0342906 A1* | 10/2020 | Kasada | ............... | G11B 23/021 |
| 2020/0365178 A1* | 11/2020 | Kasada | ................. | G11B 5/712 |
| 2020/0365179 A1* | 11/2020 | Kasada | ................ | G01B 11/14 |
| 2021/0407540 A1* | 12/2021 | Sekiguchi | ............. | G11B 5/733 |
| 2022/0028422 A1 | 1/2022 | Kaneko et al. | | |
| 2022/0208227 A1* | 6/2022 | Yamaga | ................. | G11B 5/712 |
| 2022/0254375 A1* | 8/2022 | Kaneko | ............... | G11B 23/046 |
| 2022/0270642 A1* | 8/2022 | Yamaga | ............ | G11B 5/73927 |
| 2022/0358958 A1* | 11/2022 | Kasada | .................... | G11B 5/78 |
| 2022/0358961 A1* | 11/2022 | Kasada | ................... | G11B 5/78 |
| 2022/0366935 A1* | 11/2022 | Kasada | ............... | G11B 5/7356 |

OTHER PUBLICATIONS

Non-Final Office Action dated Aug. 25, 2022 in co-pending U.S. Appl. No. 17/378,783.

Notice of Allowance dated Dec. 19, 2022 in U.S. Appl. No. 17/378,783.

* cited by examiner

MAGNETIC TAPE CARTRIDGE AND MAGNETIC TAPE APPARATUS

CROSS-REFERENCE TO RELATED APPLICATIONS

This application claims priority under 35 U.S.C 119 to Japanese Patent Application No. 2020-124710 filed on Jul. 21, 2020. The above application is hereby expressly incorporated by reference, in its entirety, into the present application.

BACKGROUND OF THE INVENTION

1. Field of the Invention

The present invention relates to a magnetic tape cartridge and a magnetic tape apparatus.

2. Description of the Related Art

There are two types of magnetic recording media: a tape shape and a disk shape, and a tape-shaped magnetic recording medium, that is, a magnetic tape is mainly used for data storage applications such as data backup and archiving (for example, see JP2012-43495A).

SUMMARY OF THE INVENTION

Recording of data on a magnetic tape and reproduction of data recorded on the magnetic tape are usually performed as follows.

The magnetic tape is run in a magnetic tape apparatus. A surface (specifically, a surface of a magnetic layer) of the running magnetic tape and a magnetic head are brought into contact with each other to be slid on each other, whereby the magnetic head records data on the magnetic tape and/or reproduces data recorded on the magnetic tape.

Usually, the magnetic tape is shipped as a product in a state of being accommodated in a magnetic tape cartridge and is stored in such a state until it is used in the magnetic tape apparatus. In addition, the magnetic tape after the data is recorded is usually stored in a state of being accommodated in the magnetic tape cartridge. The storage may be performed in a storage environment where temperature and humidity are not controlled, or in a storage environment where temperature and humidity are not strictly controlled.

With respect to this, the recording of data on the magnetic tape and/or the reproduction of data recorded on the magnetic tape may be performed in a data center where temperature and humidity are more strictly controlled than in the storage environment.

Under such circumstances, as a use form of the magnetic tape, there may be a use form in which, after the magnetic tape is taken out from a storage environment with high temperature and high humidity, the recording of data on the magnetic tape and/or the reproduction of data recorded on the magnetic tape is performed in a data center where temperature and humidity are significantly lower than those in the storage environment within a short period of time. In such a use form, a high friction coefficient in a case where the magnetic tape and the magnetic head are slid on each other causes lowering of running stability. Therefore, in order to improve the running stability in the above-described use form, it is desirable that the magnetic tape accommodated in the magnetic tape cartridge has excellent friction characteristics in a state of being exposed to a large change in temperature and humidity (specifically, environmental change from a high temperature and high humidity environment to an environment with lower temperature and humidity) within a short period of time.

In view of the above description, an object of an aspect of the present invention is to provide a magnetic tape cartridge comprising a magnetic tape having excellent friction characteristics in a state of being exposed to the above-described large change in temperature and humidity within a short period of time.

An aspect of the present invention relates to a magnetic tape cartridge comprising a magnetic tape that is accommodated in the magnetic tape cartridge while being wound around a reel hub, in which a water absorption amount of the magnetic tape measured after the magnetic tape cartridge is stored in a storage environment of a temperature of 32° C. and a relative humidity of 80% for 10 days is 0.30 g or less as a value in terms of a length of the magnetic tape of 1000 m, and the water absorption amount is a value measured in a measurement environment with a temperature of 21° C. and a relative humidity of 50% within 1 hour after the storage.

In one embodiment, the water absorption amount may be 0.10 g or more and 0.30 g or less.

In one embodiment, the magnetic tape may have a non-magnetic support and a magnetic layer including a ferromagnetic powder, and the non-magnetic support may be a polyester support.

In one embodiment, the magnetic tape may further have a non-magnetic layer including a non-magnetic powder between the non-magnetic support and the magnetic layer.

In one embodiment, the magnetic tape may further have a back coating layer including a non-magnetic powder on a surface side of the non-magnetic support opposite to a surface side having the magnetic layer.

In one embodiment, a tape thickness of the magnetic tape may be 5.6 μm or less.

In one embodiment, a tape thickness of the magnetic tape may be 5.3 μm or less.

Another aspect of the present invention relates to a magnetic tape apparatus comprising the magnetic tape cartridge.

According to an aspect of the present invention, it is possible to provide a magnetic tape cartridge comprising a magnetic tape having excellent friction characteristics in a state of being exposed to environmental change from a high temperature and high humidity environment to an environment with lower temperature and humidity within a short period of time. In addition, according to an aspect of the present invention, it is possible to provide a magnetic tape apparatus including such a magnetic tape cartridge.

DESCRIPTION OF THE PREFERRED EMBODIMENTS

Magnetic Tape Cartridge

Figure 1:
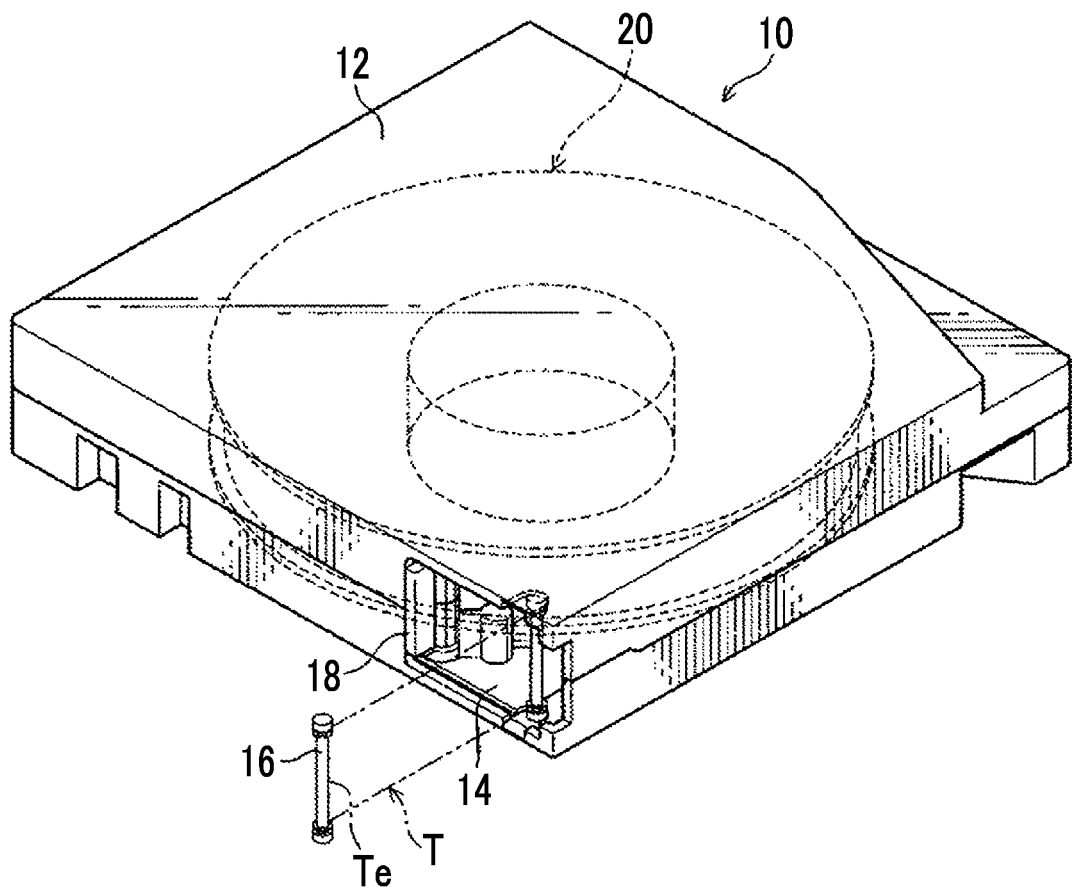
FIG. 1 is a perspective view of an example of a magnetic tape cartridge.

An aspect of the present invention relates to a magnetic tape cartridge in which a magnetic tape is accommodated while being wound around a reel hub. A water absorption amount of the magnetic tape measured after the magnetic tape cartridge is stored in a storage environment of a temperature of 32° C. and a relative humidity of 80% for 10 days is 0.30 g or less as a value in terms of a length of the magnetic tape of 1000 m. Here, the water absorption amount is a value measured in a measurement environment with a temperature of 21° C. and a relative humidity of 50% within 1 hour after the storage, and also simply referred to as a "water absorption amount" below. Unless otherwise noted, in the present invention and the present specification, the temperature related to the environment is referred to as an atmosphere temperature of such an environment.

Regarding friction characteristics of the magnetic tape, it has been conventionally considered that the friction characteristics tend to decrease in a high temperature and high humidity environment, whereas the friction characteristics tend to improve in an environment with lower temperature and humidity. However, according to the study by the present inventor, there has been found a phenomenon in which, in a case where a magnetic tape cartridge comprising a magnetic tape is used for recording or reproducing data in an environment with lower temperature and humidity within a short period of time after being stored in a high temperature and high humidity environment, the friction characteristics of the magnetic tape are lowered. The present inventor considered that a cause of occurrence of such a phenomenon is that the magnetic tape absorbs a large amount of moisture in the magnetic tape cartridge in a high temperature and high humidity environment. The present inventor supposes that in a case where the magnetic tape cartridge is used in a state where the magnetic tape absorbs a large amount of moisture without a period in which the moisture is sufficiently dehydrated, even though a use environment is a low temperature and low humidity environment compared to a storage environment, a large shearing force acts between a magnetic tape surface and a magnetic head due to the influence of the moisture, thereby lowering the friction characteristics. As a result of further intensive studies, the present inventor have newly found that in a case where the water absorption amount of the magnetic tape in the above storage environment is in the range, excellent friction characteristics are obtained in the use in an environment with lower temperature and humidity than the storage environment. The temperature and humidity of the storage environment are employed as an example of high temperature and high humidity, and an environment in which the magnetic tape cartridge is stored is not limited to the storage environment. In addition, the reason why the water absorption amount is measured within 1 hour after storage is intended to obtain a value corresponding to a state of the magnetic tape in a case of being used within a short period of time after storage. The temperature and humidity of the measurement environment are employed as an example of values lower than the temperature and humidity of the storage environment with high temperature and high humidity, and an environment in which the magnetic tape cartridge is used is not limited to the measurement environment.

Water Absorption Amount

The water absorption amount in the present invention and the present specification is obtained by the following method.

For the measurement, an unused magnetic tape cartridge that is not mounted on the magnetic tape apparatus is used.

A total of two rolls of the unused magnetic tape cartridge are prepared. These two rolls of magnetic tape cartridge can be magnetic tape cartridges manufactured in the same formulation and under the same conditions, or can be two rolls randomly extracted from the same lot of products or products of the same product name. It is acceptable that there are errors that can normally occur in a manufacturing process for the same formulation and the same conditions as described above.

From one of the two rolls of magnetic tape cartridge, the magnetic tape accommodated therein is pulled out and removed. This magnetic tape cartridge is called a "tapeless cartridge". The other roll of magnetic tape cartridge is left in a state where the magnetic tape is accommodated therein. This magnetic tape cartridge is called a "tape-containing cartridge". For the tapeless cartridge, in a case where there is an accessory (for example, a pin and a splicing tape) that is connected to the magnetic tape, the accessory is also pulled out from the magnetic tape cartridge with the magnetic tape and removed. In obtaining the water absorption amount of the magnetic tape by using the tape-containing cartridge and the tapeless cartridge as shown below, the influence of the water absorption of the accessory on the water absorption amount is nil or negligible, and therefore no consideration is required.

The tape-containing cartridge and the tapeless cartridge are placed in a measurement environment with a temperature of 21° C. and a relative humidity of 50% for 5 days or more and allowed to acclimatize to the measurement environment. After 5 days or more, the mass of the magnetic tape cartridge is measured in the same measurement environment. The mass of the tape-containing cartridge measured here is defined as "A1", and the mass of the tapeless cartridge is defined as "B1".

The tape-containing cartridge and the tapeless cartridge after the above measurement are stored in a storage environment with a temperature of 32° C. and a relative humidity of 80% for 10 days.

Within 1 hour after the above storage, the mass of the magnetic tape cartridge is measured in a measurement environment with a temperature of 21° C. and a relative humidity of 50%. The mass of the tape-containing cartridge measured here is defined as "A2", and the mass of the tapeless cartridge is defined as "B2".

A water absorption amount X of the tape-containing cartridge is calculated as "X=A2−A1".

A water absorption amount Y of the tapeless cartridge is calculated as "Y=B2−B1".

A value "X−Y" obtained by subtracting Y from X can be referred to as a water absorption amount of the magnetic tape accommodated in the magnetic tape cartridge. From the value "X−Y" and the total length L (unit: m) of the magnetic tape accommodated in the magnetic tape cartridge, a conversion value of the water absorption amount per 1000 m of the length of the magnetic tape is obtained as "((X−Y)× 1000)/L". Here, for a magnetic tape including portions other than a recording area such as a leader tape, the total length L of the magnetic tape is a length including the portions.

For the tape-containing cartridge, A1 and A2 are measured three times by the above method. An arithmetic average of the water absorption amount (conversion value per 1000 m of the length of the magnetic tape) obtained in this way is defined as the water absorption amount of the magnetic tape measured in terms of the length of 1000 m after the magnetic tape cartridge is stored in a storage environment of a temperature of 32° C. and a relative humidity of 80% for 10 days.

The water absorption amount can be referred to as an index of a degree of water absorption of the magnetic tape in a state of being accommodated in the magnetic tape cartridge. The fact that the water absorption amount measured for the magnetic tape cartridge is 0.30 g or less can contribute to obtaining excellent friction characteristics in a state of being exposed to environmental change from a high temperature and high humidity environment to an environment with lower temperature and humidity within a short period of time. From this point, the water absorption amount is 0.30 g or less, and more preferably 0.20 g or less. In addition, the water absorption amount may be, for example, 0 g, 0 g or more, more than 0 g, or 0.10 g or more. The smaller the value of the water absorption amount is, the more preferable it is from the viewpoint of improving the friction characteristics. The means for controlling the water absorption amount will be described below.

Hereinafter, the magnetic tape cartridge will be described in more detail.

Configuration of Magnetic Tape Cartridge

In the magnetic tape cartridge, the magnetic tape is accommodated inside a cartridge body in a state of being wound around a reel hub. The reel of the magnetic tape cartridge is configured of at least a reel hub, and usually, flanges are provided at both ends of the reel hub. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic tape apparatus for recording and/or reproducing data on the magnetic tape, the magnetic tape is pulled out of the magnetic tape cartridge to be wound around the reel on the magnetic tape apparatus side. A magnetic head is disposed on a magnetic tape transportation path from the magnetic tape cartridge to a winding reel. Feeding and winding of the magnetic tape are performed between a reel (supply reel) on the magnetic tape cartridge and a reel (winding reel) on the magnetic tape apparatus. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge. The magnetic tape cartridge is a single reel type magnetic tape cartridge in an aspect, and a dual reel type magnetic tape cartridge in another aspect. In an aspect, the magnetic tape cartridge is preferably a single reel type magnetic tape cartridge that has been mainly employed in the data storage field in recent years.

A configuration example of the magnetic tape cartridge will be described below with reference to the drawings. However, one embodiments shown in the drawings are examples, and the present invention is not limited to such examples.

FIG. 1 is a perspective view of an example of the magnetic tape cartridge. FIG. 1 shows a single reel type magnetic tape cartridge.

A magnetic tape cartridge 10 shown in FIG. 1 has a case 12. The case 12 is formed in a rectangular box shape. The case 12 is usually made of a resin such as polycarbonate. Only one reel 20 is rotatably accommodated inside the case 12.

Figure 2:
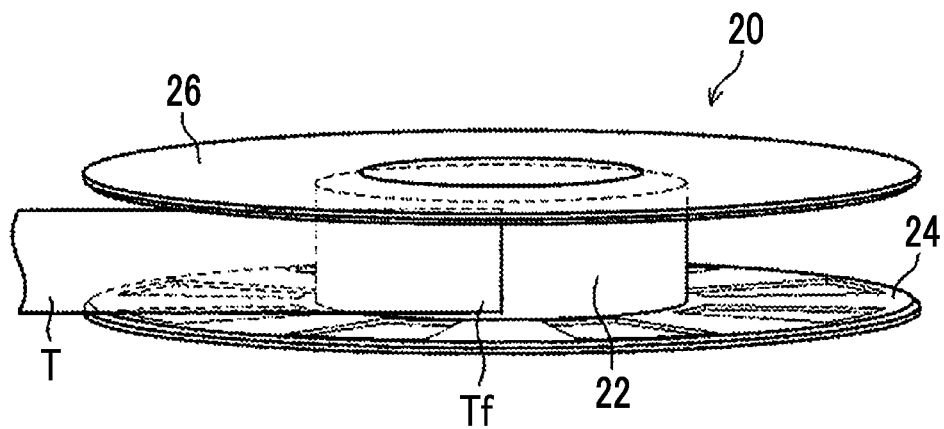
FIG. 2 is a perspective view in a case where a magnetic tape is started to be wound around a reel.
Figure 3:
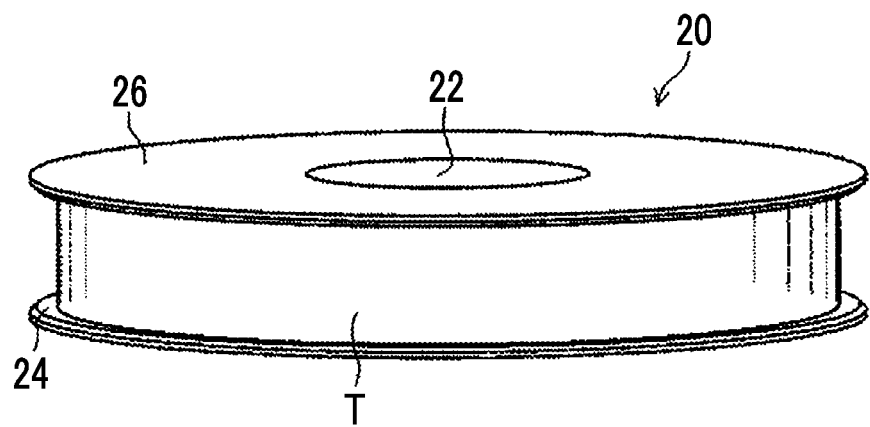
FIG. 3 is a perspective view in a case where the winding of the magnetic tape around the reel is completed.

FIG. 2 is a perspective view in a case where the magnetic tape is started to be wound around a reel. FIG. 3 is a perspective view in a case where the winding of the magnetic tape around the reel is completed.

The reel 20 has a reel hub 22. The reel hub is a cylindrical member constituting a shaft center part around which the magnetic tape is wound in the magnetic tape cartridge.

Flanges (lower flange 24 and upper flange 26) projecting outward in a radial direction from a lower end and an upper end of the reel hub 22 are provided at both ends of the reel hub 22. Here, regarding "upper" and "lower", in a case where the magnetic tape cartridge is mounted on the magnetic tape apparatus, the side located above is referred to as "upper" and the side located below is referred to as "lower". One or both of the lower flange 24 and the upper flange 26 are preferably configured integrally with the reel hub 22 from the viewpoint of reinforcing the upper end side and/or the lower end side of the reel hub 22. The term "configured integrally with" means that it is configured not as a separate member but as one member. In a first aspect, the reel hub 22 and the upper flange 26 are configured as one member, and this member is joined to the lower flange 24 configured as a separate member by a well-known method. In a second aspect, the reel hub 22 and the lower flange 24 are configured as one member, and this member is joined to the upper flange 26 configured as a separate member by a well-known method. The reel of the magnetic tape cartridge may be in any aspect. Each member can be manufactured by a well-known molding method such as injection molding.

A magnetic tape T is wound around an outer periphery of the reel hub 22 starting from a tape inner end Tf (see FIG. 2). The higher the tension applied in the longitudinal direction of the magnetic tape (hereinafter, also referred to as a "winding tension") in a case where the magnetic tape is wound around the reel hub, the tighter the magnetic tape can be wound around the reel hub. It is considered that the tighter the magnetic tape is wound around the reel hub, the narrower the gap between one surface and the other surface of the magnetic tape in contact with each other in the wound state, or the less likely the gap is to occur. It is supposed that this makes it possible to prevent moisture from entering through the gap and the magnetic tape from absorbing water. The winding tension is preferably 0.60 N (Newton) or more, more preferably 0.80 N or more, and still more preferably 1.00 N or more. In addition, the winding tension may be, for example, 2.00 N or less or 1.80 N or less. The tension applied in the longitudinal direction of the magnetic tape described in the present specification is a set value set by a tension control mechanism.

An opening 14 for pulling out the magnetic tape T wound around the reel 20 is provided in a side wall of the case 12, and a leader pin 16 to be pulled out while being locked by a pull-out member (not shown) of the magnetic tape apparatus (not shown) is fixed to a tape outer end Te of the magnetic tape T pulled out from the opening 14.

The opening 14 is opened and closed by a door 18. The door 18 is formed in a shape of a rectangular plate having a size capable of closing the opening 14, and is urged by an urging member (not shown) in a direction of closing the opening 14. In a case where the magnetic tape cartridge 10 is mounted on the magnetic tape apparatus, the door 18 is opened against an urging force of the urging member.

The above aspect is an example, and a well-known technology can be applied to the details of the magnetic tape cartridge. The total length of the magnetic tape accommodated in the magnetic tape cartridge is not particularly limited, and may be in a range of, for example, about 800 m to 2500 m. The longer the total length of the tape accommodated in one roll of the magnetic tape cartridge, the more preferable it is from the viewpoint of increasing the capacity of the magnetic tape cartridge.

Magnetic Layer

Ferromagnetic Powder

The magnetic tape accommodated in the magnetic tape cartridge can have a non-magnetic support and a magnetic layer including a ferromagnetic powder. As the ferromagnetic powder included in the magnetic layer, a well-known ferromagnetic powder as a ferromagnetic powder used in magnetic layers of various magnetic recording media can be used alone or in combination of two or more. From the viewpoint of improving recording density, it is preferable to use a ferromagnetic powder having a small average particle size. From this point, the average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from the viewpoint of magnetization stability, the average particle size of the ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferred specific examples of the ferromagnetic powder include a hexagonal ferrite powder. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and the present specification, the term "hexagonal ferrite powder" refers to a ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, and a lead atom. In the present invention and the present specification, a hexagonal strontium ferrite powder refers to a powder in which a main divalent metal atom is a strontium atom, and a hexagonal barium ferrite powder refers to a powder in which a main divalent metal atom is a barium atom. The main divalent metal atom refers to a divalent metal atom that accounts for the most on an at % basis among the divalent metal atoms included in the powder. Here, a rare earth atom is not included in the above divalent metal atom. The term "rare earth atom" in the present invention and the present specification is selected from the group consisting of a scandium atom (Sc), an yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is an aspect of the hexagonal ferrite powder, will be described in more detail.

An activation volume of the hexagonal strontium ferrite powder is preferably in a range of 800 to 1600 $nm^3$. The finely granulated hexagonal strontium ferrite powder having an activation volume in the above range is suitable for manufacturing a magnetic tape exhibiting excellent electromagnetic conversion characteristics. The activation volume of the hexagonal strontium ferrite powder is preferably 800 $nm^3$ or more, and may be, for example, 850 $nm^3$ or more. Further, from the viewpoint of further improving the electromagnetic conversion characteristics, the activation volume of the hexagonal strontium ferrite powder is more preferably 1500 $nm^3$ or less, still more preferably 1400 $nm^3$ or less, still more preferably 1300 $nm^3$ or less, still more preferably 1200 $nm^3$ or less, and still more preferably 1100 $nm^3$ or less. The same applies to an activation volume of the hexagonal barium ferrite powder.

The "activation volume" is a unit of magnetization reversal and is an index indicating the magnetic size of a particle. An activation volume described in the present invention and the present specification and an anisotropy constant Ku which will be described below are values obtained from the following relational expression between a coercivity Hc and an activation volume V, by performing measurement in a coercivity Hc measurement portion at a magnetic field sweep rate of 3 minutes and 30 minutes using a vibrating sample magnetometer (measurement temperature: 23° C.±1° C.). For a unit of the anisotropy constant Ku, 1 erg/cc=$1.0 \times 10^{-1}$ $J/m^3$.

$$Hc = 2Ku/Ms\{1-[(kT/KuV)ln(At/0.693)]^{1/2}\}$$

[In the above formula, Ku: anisotropy constant (unit: $J/m^3$), Ms: saturation magnetization (Unit: kA/m), k: Boltzmann constant, T: absolute temperature (unit: K), V: activation volume (unit: $cm^3$), A: spin precession frequency (unit: $s^{-1}$), t: magnetic field reversal time (unit: s)]

An index for reducing thermal fluctuation, in other words, for improving thermal stability may include the anisotropy constant Ku. The hexagonal strontium ferrite powder preferably may have Ku of $1.8 \times 10^5$ $J/m^3$ or more, and more preferably have Ku of $2.0 \times 10^5$ $J/m^3$ or more. Ku of the hexagonal strontium ferrite powder may be, for example, $2.5 \times 10^5$ $J/m^3$ or less. Here, the higher Ku is, the higher the thermal stability is, which is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In an aspect, the hexagonal strontium ferrite powder including a rare earth atom may have a rare earth atom surface layer portion uneven distribution property. In the present invention and the present specification, the "rare earth atom surface layer portion uneven distribution property" means that a rare earth atom content with respect to 100 at % of an iron atom in a solution obtained by partially dissolving the hexagonal strontium ferrite powder with an acid (hereinafter, referred to as a "rare earth atom surface layer portion content" or simply a "surface layer portion content" for a rare earth atom) and a rare earth atom content with respect to 100 at % of an iron atom in a solution obtained by totally dissolving the hexagonal strontium ferrite powder with an acid (hereinafter, referred to as a "rare earth atom bulk content" or simply a "bulk content" for a rare earth atom) satisfy a ratio of a rare earth atom surface layer portion content/a rare earth atom bulk content >1.0. A rare earth atom content in the hexagonal strontium ferrite powder which will be described below has the same meaning as the rare earth atom bulk content. On the other hand, partial dissolution using an acid dissolves a surface layer portion of a particle constituting the hexagonal strontium ferrite powder, and thus, a rare earth atom content in a solution obtained by partial dissolution is a rare earth atom content in a surface layer portion of a particle constituting the hexagonal strontium ferrite powder. A rare earth atom surface layer portion content satisfying a ratio of "rare earth atom surface layer portion content/rare earth atom bulk content >1.0" means that in a particle constituting the hexagonal strontium ferrite powder, rare earth atoms are unevenly distributed in a surface layer portion (that is, more than an inside). The surface layer portion in the present invention and the present specification means a partial region from a surface of a particle constituting the hexagonal strontium ferrite powder toward an inside.

In a case where the hexagonal strontium ferrite powder includes a rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle constituting the hexagonal strontium ferrite powder contribute to suppression of a decrease in reproduction output during repeated reproduction. It is supposed that this is because the hexagonal strontium ferrite powder includes a rare earth atom with a bulk content in the above range, and rare earth atoms are unevenly distributed in a surface layer portion of a particle constituting the hexagonal strontium ferrite powder, and thus it is possible to increase an anisotropy constant Ku. The higher a value of an anisotropy constant Ku is, the more a phenomenon called so-called thermal fluctuation can be suppressed (in other words, thermal stability can be improved). By suppressing occurrence of thermal fluctuation, it is possible to suppress a decrease in reproduction output during repeated reproduction. It is supposed that uneven distribution of rare earth atoms in a particulate surface layer portion of the hexagonal strontium ferrite powder contributes to stabilization of spins of iron (Fe) sites in a crystal lattice of a surface layer portion, and thus, an anisotropy constant Ku may be increased.

Moreover, it is supposed that the use of the hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that the hexagonal strontium ferrite powder having a rare earth atom surface layer portion uneven distribution property can also contribute to an improvement of running durability of the magnetic tape. It is supposed that this may be because uneven distribution of rare earth atoms on a surface of a particle constituting the hexagonal strontium ferrite powder contributes to an improvement of interaction between the particle surface and an organic substance (for example, a binding agent and/or an additive) included in the magnetic layer, and, as a result, a strength of the magnetic layer is improved.

From the viewpoint of further suppressing a decrease in reproduction output during repeated reproduction and/or the viewpoint of further improving running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving the hexagonal strontium ferrite powder. In the present invention and the present specification, unless otherwise noted, the content of an atom means a bulk content obtained by totally dissolving the hexagonal strontium ferrite powder. The hexagonal strontium ferrite powder including a rare earth atom may include only one kind of rare earth atom as the rare earth atom, or may include two or more kinds of rare earth atoms. The bulk content in a case of including two or more types of rare earth atoms is obtained for the total of two or more types of rare earth atoms. This also applies to other components in the present invention and the present specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom need only be any one or more of rare earth atoms. As a rare earth atom that is preferable from the viewpoint of further suppressing a decrease in reproduction output during repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms need only be unevenly distributed in the surface layer portion of a particle constituting the hexagonal strontium ferrite powder, and the degree of uneven distribution is not limited. For example, for a hexagonal strontium ferrite powder having a rare earth atom surface layer portion uneven distribution property, a ratio of a surface layer portion content of a rare earth atom obtained by partial dissolution under dissolution conditions which will be described below to a bulk content of a rare earth atom obtained by total dissolution under dissolution conditions which will be described below, that is, "surface layer portion content/bulk content" exceeds 1.0 and may be 1.5 or more. The fact that "surface layer portion content/bulk content" is larger than 1.0 means that in a particle constituting the hexagonal strontium ferrite powder, rare earth atoms are unevenly distributed in the surface layer portion (that is, more than an inside). Further, a ratio of a surface layer portion content of a rare earth atom obtained by partial dissolution under dissolution conditions which will be described below to a bulk content of a rare earth atom obtained by total dissolution under the dissolution conditions which will be described below, that is, "surface layer portion content/bulk content" may be, for example, 10.0 or less, 9.0 or less, 8.0 or less, 7.0 or less, 6.0 or less, 5.0 or less, or 4.0 or less. Here, in the hexagonal strontium ferrite powder having a rare earth atom surface layer portion uneven distribution property, the rare earth atoms need only be unevenly distributed in the surface layer portion of a particle constituting the hexagonal strontium ferrite powder, and "surface layer portion content/bulk content" is not limited to the exemplified upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-91747A, for example.

The partial dissolution means that dissolution is performed such that, at the end of dissolution, the residue of the hexagonal strontium ferrite powder can be visually confirmed in the solution. For example, by partial dissolution, it is possible to dissolve a region of 10 to 20 mass % of the particle constituting the hexagonal strontium ferrite powder with the total particle being 100 mass %. On the other hand, the total dissolution means that dissolution is performed such that, at the end of dissolution, the residue of the hexagonal strontium ferrite powder cannot be visually confirmed in the solution.

The partial dissolution and measurement of the surface layer portion content are performed by the following method, for example. Here, the following dissolution conditions such as the amount of sample powder are exemplified, and dissolution conditions for partial dissolution and total dissolution can be employed in any manner.

A container (for example, a beaker) containing 12 mg of the sample powder and 10 mL of 1 mol/L hydrochloric acid is held on a hot plate at a set temperature of 70° C. for 1 hour. The obtained solution is filtered by a membrane filter of 0.1 µm. Elemental analysis of the filtrated solution is performed by an inductively coupled plasma (ICP) analyzer. In this way, the surface layer portion content of a rare earth atom with respect to 100 at % of an iron atom can be obtained. In a case where a plurality of types of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of the sample powder and 10 mL of 4 mol/L hydrochloric acid is held on a hot plate at a set temperature of 80° C. for 3 hours. Thereafter, the same procedure as the partial dissolution and the measurement of the surface layer portion content is carried out, and the bulk content with respect to 100 at % of an iron atom can be obtained.

From the viewpoint of increasing the reproduction output in a case of reproducing data recorded on the magnetic tape, it is desirable that mass magnetization σs of the ferromagnetic powder included in the magnetic tape is high. In this regard, the hexagonal strontium ferrite powder including a rare earth atom but not having the rare earth atom surface layer portion uneven distribution property tends to have a larger decrease in σs than that of the hexagonal strontium ferrite powder including no rare earth atom. With respect to this, it is considered that the hexagonal strontium ferrite powder having a rare earth atom surface layer portion uneven distribution property is preferable in suppressing such a large decrease in σs. In an aspect, σs of the hexagonal strontium ferrite powder may be 45 A·m²/kg or more, and may be 47 A·m²/kg or more. On the other hand, from the viewpoint of noise reduction, σs is preferably 80 A·m²/kg or less and more preferably 60 A·m²/kg or less. σs can be measured using a well-known measuring device, such as a vibrating sample magnetometer, capable of measuring magnetic properties. In the present invention and the present specification, unless otherwise noted, the mass magnetization σs is a value measured at a magnetic field intensity of 15 kOe. 1 [kOe]=$10^6/4\pi$[A/m]

Regarding the content (bulk content) of a constituent atom of the hexagonal strontium ferrite powder, a strontium atom content may be, for example, in a range of 2.0 to 15.0 at % with respect to 100 at % of an iron atom. In an aspect, the hexagonal strontium ferrite powder may include only a strontium atom as a divalent metal atom. In another aspect, the hexagonal strontium ferrite powder may include one or more other divalent metal atoms in addition to a strontium atom. For example, a barium atom and/or a calcium atom may be included. In a case where divalent metal atoms other than a strontium atom are included, a barium atom content and a calcium atom content in the hexagonal strontium ferrite powder are, for example, in a range of 0.05 to 5.0 at % with respect to 100 at % of an iron atom.

As a crystal structure of hexagonal ferrite, a magnetoplumbite type (also referred to as an "M-type"), a W-type, a Y-type, and a Z-type are known. The hexagonal strontium ferrite powder may have any crystal structure. The crystal structure can be confirmed by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom may be, for example, 0.5 to 10.0 at % with respect to 100 at % of an iron atom. From the viewpoint of further suppressing a decrease in reproduction output during repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in an aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving the hexagonal strontium ferrite powder into a value expressed in at % using an atomic weight of each atom. Further, in the present invention and the present specification, the term "not include" for a certain atom means that a content measured by an ICP analyzer after total dissolution is 0 mass %. A detection limit of the ICP analyzer is usually 0.01 parts per million (ppm) or less on a mass basis. The term "not included" is used as a meaning including that an atom is included in an amount less than the detection limit of the ICP analyzer. In an aspect, the hexagonal strontium ferrite powder may not include a bismuth atom (Bi).

Metal Powder

Preferred specific examples of the ferromagnetic powder include a ferromagnetic metal powder. For details of the ferromagnetic metal powder, for example, descriptions disclosed in paragraphs 0137 to 0141 of JP2011-216149A and paragraphs 0009 to 0023 of JP2005-251351A can be referred to.

ε-Iron Oxide Powder

Preferred specific examples of the ferromagnetic powder include an ε-iron oxide powder. In the present invention and the present specification, the term "ε-iron oxide powder" refers to a ferromagnetic powder in which an ε-iron oxide type crystal structure is detected as a main phase by X-ray diffraction analysis. For example, in a case where the highest intensity diffraction peak is attributed to an ε-iron oxide type crystal structure in an X-ray diffraction spectrum obtained by X-ray diffraction analysis, it is determined that the ε-iron oxide type crystal structure is detected as the main phase. As a method of manufacturing the ε-iron oxide powder, a producing method from a goethite, a reverse micelle method, and the like are known. All of the manufacturing methods are well known. Regarding a method of manufacturing an ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. 5280 to 5284, J. Mater. Chem. C, 2013, 1, pp. 5200 to 5206 can be referred to, for example. Here, the method of manufacturing the ε-iron oxide powder capable of being used as the ferromagnetic powder in the magnetic layer of the magnetic tape is not limited to the methods described here.

An activation volume of the ε-iron oxide powder is preferably in a range of 300 to 1500 nm$^3$. The finely granulated ε-iron oxide powder having an activation volume in the above range is suitable for manufacturing a magnetic tape exhibiting excellent electromagnetic conversion characteristics. The activation volume of the ε-iron oxide powder is preferably 300 nm$^3$ or more, and may be, for example, 500 nm$^3$ or more. Further, from the viewpoint of further improving the electromagnetic conversion characteristics, the activation volume of the ε-iron oxide powder is more preferably 1400 nm$^3$ or less, still more preferably 1300 nm$^3$ or less, still more preferably 1200 nm$^3$ or less, and still more preferably 1100 nm$^3$ or less.

An index for reducing thermal fluctuation, in other words, for improving thermal stability may include the anisotropy constant Ku. The ε-iron oxide powder preferably has Ku of $3.0 \times 10^4$ J/m$^3$ or more, and more preferably has Ku of $8.0 \times 10^4$ J/m$^3$ or more. Ku of the ε-iron oxide powder may be, for example, $3.0 \times 10^5$ J/m$^3$ or less. Here, the higher Ku is, the higher the thermal stability is, which is preferable, and thus, a value thereof is not limited to the values exemplified above.

From the viewpoint of increasing the reproduction output in a case of reproducing data recorded on the magnetic tape, it is desirable that mass magnetization σs of the ferromagnetic powder included in the magnetic tape is high. In this regard, in an aspect, σs of the ε-iron oxide powder may be 8 A·m$^2$/kg or more, and may be 12 A·m$^2$/kg or more. On the other hand, from the viewpoint of noise reduction, σs of the ε-iron oxide powder is preferably 40 A·m$^2$/kg or less and more preferably 35 A·m$^2$/kg or less.

In the present invention and the present specification, unless otherwise noted, an average particle size of various powders such as ferromagnetic powders is a value measured by the following method using a transmission electron microscope.

The powder is imaged at an imaging magnification of 100,000 using a transmission electron microscope, and the image is printed on printing paper so that the total magnification is 500,000 to obtain an image of particles constituting the powder. A target particle is selected from the obtained image of particles, an outline of the particle is traced by a digitizer, and a size of the particle (primary particle) is measured. The primary particle is an independent particle which is not aggregated.

The measurement described above is performed regarding 500 particles randomly extracted. An arithmetic average of the particle sizes of 500 particles thus obtained is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described below is a value measured by using a transmission electron microscope H-9000 manufactured by Hitachi, Ltd. as the transmission electron microscope, and image analysis software KS-400 manufactured by Carl Zeiss as the image analysis software, unless otherwise noted.

In the present invention and the present specification, the powder means an aggregate of a plurality of particles. For example, the ferromagnetic powder means an aggregate of a plurality of ferromagnetic particles. Further, the aggregate of the plurality of particles not only includes an aspect in which particles constituting the aggregate directly come into contact with each other, but also includes an aspect in which a binding agent or an additive which will be described below is interposed between the particles. The term "particle" is used to describe a powder in some cases.

As a method of taking a sample powder from the magnetic tape in order to measure the particle size, a method disclosed in a paragraph 0015 of JP2011-048878A can be employed, for example.

In the present invention and the present specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles constituting the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding the above 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %. A high filling percentage of the ferromagnetic powder in the magnetic layer is preferable from the viewpoint of improvement of recording density.

Binding Agent

The magnetic tape can be a coating type magnetic tape, and include a binding agent in the magnetic layer. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can also be used as the binding agent in a non-magnetic layer and/or a back coating layer which will be described below.

For the above binding agent, descriptions disclosed in paragraphs 0028 to 0031 of JP2010-24113A can be referred to. An average molecular weight of the resin used as the binding agent can be, for example, 10,000 or more and 200,000 or less as a weight-average molecular weight. The weight-average molecular weight of the present invention and the present specification is a value obtained by performing polystyrene conversion of a value measured by gel permeation chromatography (GPC) under the following measurement conditions. A weight-average molecular weight of a binding agent shown in Examples which will be described below is a value obtained by performing polystyrene conversion of a value measured under the following measurement conditions. The binding agent can be used in an amount of, for example, 1.0 to 30.0 parts by mass with respect to 100.0 parts by mass of the ferromagnetic powder.

GPC device: HLC-8120 (manufactured by Tosoh Corporation)
Column: TSK gel Multipore HXL-M (manufactured by Tosoh Corporation, 7.8 mm inner diameter (ID)×30.0 cm)
Eluent: Tetrahydrofuran (THF)

Curing Agent

A curing agent can also be used together with the resin which can be used as the binding agent. As the curing agent, in an aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. Curing reaction proceeds in a magnetic layer forming process, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent may be used in a magnetic layer forming composition in an amount of, for example, 0 to 80.0 parts by mass, and preferably 50.0 to 80.0 parts by mass from a viewpoint of improving a strength of the magnetic layer, with respect to 100.0 parts by mass of the binding agent.

Additive

The magnetic layer may include one or more kinds of additives, as necessary. As the additives, the curing agent described above is used as an example. In addition, examples of the additive which can be included in the magnetic layer include a non-magnetic powder (for example, an inorganic powder or carbon black), a lubricant, a dispersing agent, a dispersing assistant, an antibacterial agent, an antistatic agent, an antioxidant, and the like. For example, for the lubricant, descriptions disclosed in paragraphs 0030 to 0033, 0035, and 0036 of JP2016-126817A can be referred to. The non-magnetic layer described below may include a lubricant. For the lubricant which may be included in the non-magnetic layer, descriptions disclosed in paragraphs 0030, 0031, and 0034 to 0036 of JP2016-126817A can be referred to. For the dispersing agent, descriptions disclosed in paragraphs 0061 and 0071 of JP2012-133837A can be referred to. The dispersing agent may be added to a non-magnetic layer forming composition. For the dispersing agent that can be added to the non-magnetic layer forming composition, a description disclosed in a paragraph 0061 of JP2012-133837A can be referred to. As the non-magnetic powder that can be included in the magnetic layer, a non-magnetic powder which can function as an abrasive, or a non-magnetic powder which can function as a protrusion forming agent which forms protrusions suitably protruded from the magnetic layer surface (for example, non-magnetic colloidal particles) is used. An average particle size of colloidal silica (silica colloidal particle) shown in examples described below is a value obtained by a method disclosed in a paragraph 0015 of JP2011-048878A as a method for measuring an average particle diameter. As the additive, a commercially available product can be suitably selected or manufactured by a well-known method according to the desired properties, and any amount thereof can be used. Examples of the additive that can be used to improve the dispersibility of the abrasive in the magnetic layer containing the abrasive include a dispersing agent disclosed in paragraphs 0012 to 0022 of JP2013-131285A.

The magnetic layer described above can be provided directly on a surface of the non-magnetic support or indirectly through the non-magnetic layer.

Non-Magnetic Layer

Next, the non-magnetic layer will be described. The above magnetic tape may have a magnetic layer directly on the surface of the non-magnetic support, or may have a magnetic layer on the surface of the non-magnetic support through a non-magnetic layer including a non-magnetic powder. The non-magnetic powder used for the non-magnetic layer may be an inorganic substance powder or an organic substance powder. In addition, carbon black and the like can be used. Examples of the inorganic substance powder include powders of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50 to 90 mass % and more preferably in a range of 60 to 90 mass %.

The non-magnetic layer can include a binding agent, and can also include an additive. For other details of the binding agent or the additive of the non-magnetic layer, a well-known technology regarding the non-magnetic layer can be applied. In addition, in regards to the type and the content of the binding agent, and the type and the content of the additive, for example, a well-known technology regarding the magnetic layer can be applied.

In the present invention and the present specification, the non-magnetic layer also includes a substantially non-magnetic layer including a small amount of ferromagnetic powder as impurities, for example, or intentionally, together with the non-magnetic powder. Here, the substantially non-magnetic layer refers to a layer having a residual magnetic flux density of 10 mT or less, a coercivity of 7.96 kA/m (100 Oe) or less, or a residual magnetic flux density of 10 mT or less and a coercivity of 7.96 kA/m (100 Oe) or less. It is preferable that the non-magnetic layer does not have a residual magnetic flux density and a coercivity.

Back Coating Layer

The magnetic tape may or may not have a back coating layer including a non-magnetic powder on a surface side of the non-magnetic support opposite to a surface side provided with the magnetic layer. Preferably, the back coating layer contains one or both of carbon black and an inorganic powder. The back coating layer can include a binding agent, and can also include an additive. In regards to the binding agent and the additive of the back coating layer, the well-known technology regarding the back coating layer can be applied, and the well-known technology regarding the formulation of the magnetic layer and/or the non-magnetic layer can be applied. For example, for the back coating layer, descriptions disclosed in paragraphs 0018 to 0020 of JP2006-331625A and column 4, line 65 to column 5, line 38 of U.S. Pat. No. 7,029,774B can be referred to.

Non-Magnetic Support

Examples of the non-magnetic support (hereinafter, simply referred to as a "support") include well-known components such as polyethylene terephthalate, polyethylene naphthalate, polyamide, polyamideimide, and aromatic polyamide. Among these, polyethylene terephthalate and polyethylene naphthalate are preferable.

In an aspect, the non-magnetic support of the magnetic tape can be a polyester support. In the present invention and the present specification, the term "polyester" means a resin containing a plurality of ester bonds. The term "polyester support" means a support containing at least one layer of polyester film. The term "polyester film" refers to a film in which a component that occupies the largest amount on a mass basis among components constituting the film is a polyester. The term "polyester support" in the present invention and the present specification includes those in which all resin films contained in the support are polyester films, and those containing the polyester film and another resin film. Specific aspects of the polyester support include a single-layer polyester film, a laminated film of two or more polyester films having the same constituent components, a laminated film of two or more polyester films having different constituent components, a laminated film including one or more polyester films and one or more resin films other than the polyester film, and the like. An adhesive layer or the like may be optionally included between two adjacent layers in the laminated film. The polyester support may optionally include a metal film and/or a metal oxide film formed on one or both surfaces by vapor deposition or the like. The same applies to an "aromatic polyester support", a "polyethylene terephthalate support", and a "polyethylene naphthalate support" in the present invention and the present specification.

The polyester support can be an aromatic polyester support. In the present invention and the present specification, the term "aromatic polyester" means a resin containing an aromatic skeleton and a plurality of ester bonds, and the "aromatic polyester support" means a support containing at least one aromatic polyester film.

An aromatic ring contained in the aromatic skeleton of the aromatic polyester is not particularly limited. Specific examples of the aromatic ring include a benzene ring and a naphthalene ring.

For example, polyethylene terephthalate (PET) is a polyester containing a benzene ring, and is a resin obtained by polycondensing ethylene glycol with terephthalic acid and/or dimethyl terephthalate. The term "polyethylene terephthalate" in the present invention and the present specification includes those having a structure having one or more other components (for example, a copolymer component, a component introduced into a terminal or a side chain, or the like) in addition to the above component.

Polyethylene naphthalate (PEN) is a polyester containing a naphthalene ring, and is a resin obtained by performing an esterification reaction between dimethyl 2,6-naphthalenedicarboxylate and ethylene glycol and then performing a transesterification reaction and a polycondensation reaction. The term "polyethylene naphthalate" in the present invention and the present specification includes those having a structure having one or more other components (for example, a copolymer component, a component introduced into a terminal or a side chain, or the like) in addition to the above component.

The non-magnetic support may be a biaxially stretched film, and may be a film that has been subjected to corona discharge, a plasma treatment, an easy-bonding treatment, a heat treatment, or the like.

As an index of the physical properties of the non-magnetic support, for example, a moisture content can be used. In the present invention and the present specification, a moisture content of the non-magnetic support is a value obtained by the following method. The moisture content shown in the table below is a value obtained by the following method.

A sample piece (for example, a sample piece having a mass of a few grams) cut out from the non-magnetic support of which the moisture content is to be measured is dried in a vacuum dryer at a temperature of 180° C. and a pressure of 100 Pa (Pascal) or less until the sample piece has a constant weight. A mass of the sample piece thus dried is defined as W1. W1 is a value measured in a measurement environment of a temperature of 23° C. and a relative humidity of 50% within 30 seconds after the sample piece is taken out from the vacuum dryer. Next, a mass of this sample piece after being left under an environment of a temperature of 25° C. and a relative humidity of 75% for 48 hours is defined as W2. W2 is a value measured in a measurement environment of a temperature of 23° C. and a relative humidity of 50% within 30 seconds after the sample piece is taken out from the environment. The moisture content is calculated by the following equation.

Moisture content (%)=[(W2−W1)/W1]×100

For example, after removing portions, such as the magnetic layer, other than the non-magnetic support from the magnetic tape by a well-known method (for example, film removal using an organic solvent), the moisture content of the non-magnetic support can be obtained by the above method.

The non-magnetic support of the magnetic tape preferably has a moisture content of 0.80% or less, and more preferably has a moisture content of 0.60% or less. In addition, the moisture content of the non-magnetic support of the magnetic tape may be 0%, 0% or more, more than 0%, or 0.10% or more. The present inventor supposes that the use of a non-magnetic support having a low moisture content obtained by the above method can contribute to reduction of the value of the water absorption amount obtained by the method described above for the magnetic tape cartridge.

As an index of the physical properties of the non-magnetic support, for example, a Young's modulus can be used. In the present invention and the present specification, the Young's modulus of the non-magnetic support is a value to be measured by the following method in a measurement environment with a temperature of 23° C. and a relative humidity of 50%. The Young's modulus shown in the table below is a value obtained by the following method using Tensilon manufactured by Toyo Baldwin Co., Ltd. as a universal tensile test device.

A sample piece cut out from the non-magnetic support to be measured is pulled by a universal tensile test device under the conditions of a distance between chucks of 100 mm, a tensile speed of 10 mm/min, and a chart speed of 500 mm/min. As the universal tensile test device, for example, a commercially available universal tensile test device such as Tensilon manufactured by Toyo Baldwin Co., Ltd. or a universal tensile test device having a well-known configuration can be used. Young's moduli in a longitudinal direction and a width direction of the sample piece are calculated from a tangent line of a rising portion of a load-elongation curve thus obtained. Here, the longitudinal direction and the width direction of the sample piece mean a longitudinal direction and a width direction in a case where the sample piece is included in the magnetic tape.

For example, after removing portions, such as the magnetic layer, other than the non-magnetic support from the magnetic tape by a well-known method (for example, film removal using an organic solvent), the Young's moduli in the longitudinal direction and the width direction of the non-magnetic support can be obtained by the above method.

In an aspect, the non-magnetic support of the magnetic tape may have a Young's modulus in the longitudinal direction of, for example, 3000 MPa or more, 5000 MPa or more, or 7000 MPa or more. In addition, the Young's modulus of the non-magnetic support of the magnetic tape in the longitudinal direction may be, for example, 15000 MPa or less, 13000 MPa or less, or 11000 MPa or less. For the width direction, the non-magnetic support of the magnetic tape may have a Young's modulus in the width direction of, for example, 2000 MPa or more, 3000 MPa or more, or 4000 MPa or more. In addition, the Young's modulus of the non-magnetic support of the magnetic tape in the width direction may be, for example, 10000 MPa or less, 8000 MPa or less, or 6000 MPa or less. In a case where the magnetic tape is manufactured, the non-magnetic support is usually used in a machine direction (MD direction) as the longitudinal direction and a transverse direction (TD direction) as the width direction of the film. In an aspect, the Young's modulus in the longitudinal direction is greater than the Young's modulus in the width direction, in another aspect, the Young's modulus in the longitudinal direction is smaller than the Young's modulus in the width direction, and in another aspect, the Young's modulus in the longitudinal direction and the Young's modulus in the width direction are the same value.

The moisture content and the Young's modulus of the non-magnetic support can be controlled by the types and mixing ratios of the components constituting the support, the manufacturing conditions of the support, and the like. For example, in a biaxial stretching treatment, the Young's modulus in the longitudinal direction and the Young's modulus in the width direction can be controlled by adjusting a stretching ratio in each direction.

Various Thicknesses

Regarding a thickness (total thickness) of the magnetic tape, it has been required to increase the recording capacity (increase the capacity) of the magnetic tape with the enormous increase in the amount of information in recent years. For example, as means for increasing the capacity, a thickness of the magnetic tape may be reduced (hereinafter, also referred to as "thinning") to increase a length of the magnetic tape accommodated in one roll of a magnetic tape cartridge. From this point, the thickness (total thickness) of the magnetic tape is preferably 5.6 μm or less, more preferably 5.5 μm or less, still more preferably 5.4 μm or less, still more preferably 5.3 μm or less, and still more preferably 5.2 μm or less. In addition, from the viewpoint of ease of handling, the thickness of the magnetic tape is preferably 3.0 μm or more, and more preferably 3.5 μm or more.

The thickness (total thickness) of the magnetic tape can be measured by the following method.

Ten tape samples (for example, 5 to 10 cm in length) are cut out from any part of the magnetic tape, and these tape samples are stacked to measure the thickness. A value (thickness per tape sample) obtained by dividing the measured thickness by 1/10 is defined as the tape thickness. The thickness measurement can be performed using a well-known measuring device capable of measuring the thickness on the order of 0.1 μm.

A thickness of the non-magnetic support is preferably 3.0 to 5.0 μm.

A thickness of the magnetic layer can be optimized according to a saturation magnetization amount, a head gap length, and a band of a recording signal of the used magnetic head, and is generally 0.01 μm to 0.15 μm, and from a viewpoint of high-density recording, is preferably 0.02 μm to 0.12 μm, and more preferably 0.03 μm to 0.1 μm. The magnetic layer need only be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 1.5 μm, and preferably 0.1 to 1.0 μm.

A thickness of the back coating layer is preferably 0.9 μm or less, and more preferably 0.1 to 0.7 μm.

Various thicknesses such as the thickness of the magnetic layer can be obtained by the following method.

A cross section of the magnetic tape in a thickness direction is exposed by an ion beam, and then the exposed cross section observation is performed using a scanning electron microscope. Various thicknesses can be obtained as an arithmetic average of thicknesses obtained at two optional points in the cross section observation. Alternatively, the various thicknesses can be obtained as a designed thickness calculated according to manufacturing conditions.

Edge Weave Amount

In an aspect, the water absorption amount obtained for the magnetic tape cartridge can be controlled by the edge weave amount of the magnetic tape.

The edge weave amount and a cycle of the edge weave will be described below.

Figure 4:
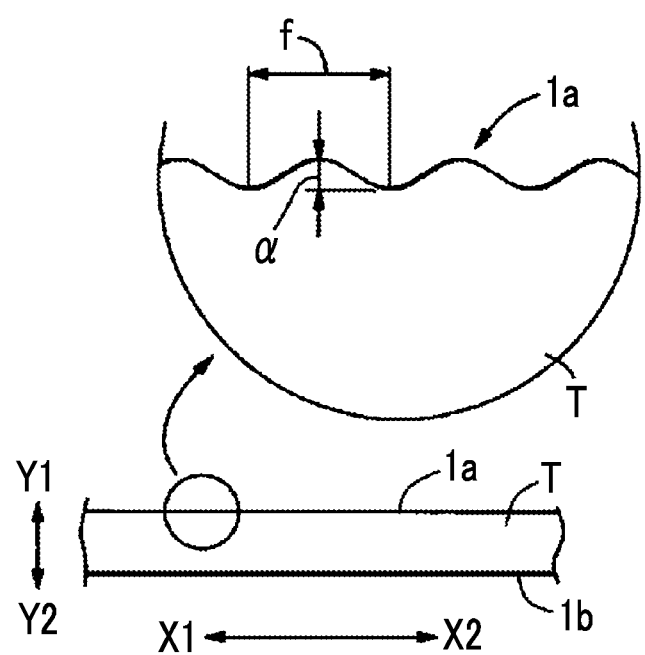
FIG. 4 is an explanatory diagram of an edge weave.

FIG. 4 is an explanatory diagram of the edge weave. FIG. 4 schematically shows tape edges 1a and 1b of the magnetic tape T by partially enlarging the tape edge 1a. In FIG. 4, an X1-X2 direction is the longitudinal direction of the magnetic tape and can also be referred to as the running direction. A Y1-Y2 direction is the width direction of the magnetic tape. The tape edge of the magnetic tape may have wavy irregularities (irregularities of a shape in which an end surface in the width direction of the magnetic tape is wavy along the longitudinal direction) called an edge weave (or edge wave). The edge weave amount (a in FIG. 4) of the edge weave is measured by an edge weave amount measuring device over 50 m in the longitudinal direction of a randomly selected region of the tape edge 1a or 1b. In addition, the cycle (f in FIG. 4) of the edge weave can be obtained by performing Fourier analysis on the measured edge weave amount. As the edge weave amount measuring device, a commercially available edge weave amount measuring device (for example, manufactured by Keyence Corporation) can be used. The measurement environment is an environment with an atmosphere temperature of 23° C. and a relative humidity of 50%. The magnetic tape is generally distributed while being accommodated in the magnetic tape cartridge. As the magnetic tape to be measured, a magnetic tape taken out from an unused magnetic tape cartridge that is not attached to the magnetic tape apparatus is used.

The edge weave amount of the tape edge on at least on side of the magnetic tape is preferably 1.5 μm or less, more preferably 1.4 μm or less, still more preferably 1.3 μm or less, and still more preferably 1.2 μm or less, from the viewpoint of reducing the value of the water absorption amount. It is considered that the tighter the magnetic tape is wound around the reel hub, the narrower the gap between one surface and the other surface of the magnetic tape in contact with each other in the wound state, or the less likely the gap is to occur. It is supposed that this makes it possible to prevent moisture from entering through the gap and the magnetic tape from absorbing water. In this regard, the present inventor considers that a small edge weave amount is preferable for tightly winding the magnetic tape around the reel hub in a case where the magnetic tape is wound around the reel hub. On the other hand, from the viewpoint of suppressing a deterioration of electromagnetic conversion characteristics after long-term storage, the edge weave amount is preferably 0.1 μm or more, more preferably 0.3 μm or more, still more preferably 0.6 μm or more, and still more preferably 0.8 μm or more. The tape edge having an edge weave amount in the above range can be a tape edge on only one side of the magnetic tape, or can be a tape edge on both sides of the magnetic tape. For example, usually, in the magnetic tape, the position of the magnetic tape in the width direction can be regulated by an inner surface of a flange of a guide roller provided in the magnetic tape apparatus. In a case where the tape edge whose position in the width direction is regulated in this way is called a "running reference side tape edge", it is preferable that the edge weave amount in the running reference side tape edge is in the above range. In addition, as the magnetic tape apparatus, there is also an apparatus having a configuration in which the positions of the tape edges on both sides of the magnetic tape in the width direction of the magnetic tape are regulated, and in such an apparatus, both tape edges on both sides can be called a running reference side tape edge.

In addition, from the viewpoint of suppressing a deterioration of electromagnetic conversion characteristics after long-term storage, the cycle of the edge weave in which the edge weave amount is in the above range is preferably 130.0 mm or less, more preferably 100.0 mm or less, and still more preferably 80.0 mm or less. From this point, the cycle is preferably 65.0 mm or more, more preferably 70.0 mm or more, and still more preferably 80.0 mm or more. The cycle of the edge weave and the edge weave amount can be controlled by a slit condition in a case of manufacturing the magnetic tape and the like. For the control method, descriptions disclosed in a paragraph 0030 of JP2002-269711A and Examples of the same publication can also be referred to.

Manufacturing Process

Preparation of Each Layer Forming Composition

A process of preparing a composition for forming the magnetic layer, the non-magnetic layer, or the back coating layer can generally include at least a kneading process, a dispersing process, and a mixing process provided before and after these processes as necessary. Each process may be divided into two or more stages. Components used for the preparation of each layer forming composition may be added at an initial stage or in a middle stage of each process. As a solvent, one kind or two or more kinds of various solvents generally used for manufacturing a coating type magnetic recording medium can be used. For the solvent, for example, a description disclosed in a paragraph 0153 of JP2011-216149A can be referred to. In addition, each component may be separately added in two or more processes. For example, a binding agent may be added separately in a kneading process, a dispersing process, and a mixing process for adjusting a viscosity after dispersion. In order to manufacture the magnetic tape, a well-known manufacturing technology can be used in various processes. In the kneading process, an open kneader, a continuous kneader, a pressure kneader, or a kneader having a strong kneading force such as an extruder is preferably used. For details of the kneading treatment, descriptions disclosed in JP1989-106338A (JP-H01-106338A) and JP1989-79274A (JP-H01-79274A) can be referred to. As a dispersing device, a well-known dispersing device can be used. In any stage of preparing each layer forming composition, filtering may be performed by a well-known method. The filtering can be performed by using a filter, for example. As the filter used in the filtering, a filter having a pore diameter of 0.01 to 3 μm (for example, filter made of glass fiber or filter made of polypropylene) can be used, for example.

Coating Process

The magnetic layer can be formed by directly applying the magnetic layer forming composition onto the surface of the non-magnetic support or performing multilayer applying of the magnetic layer forming composition with the non-magnetic layer forming composition in order or at the same time. The back coating layer can be formed by applying the back coating layer forming composition onto a surface of the non-magnetic support opposite to a surface having the non-magnetic layer and/or the magnetic layer (or to be provided with the non-magnetic layer and/or the magnetic layer). For details of application for forming each layer, a description disclosed in a paragraph 0066 of JP2010-231843A can be referred to.

Other Processes

Well-known technologies can be applied to other various processes for manufacturing the magnetic tape. For the various processes, for example, descriptions disclosed in paragraphs 0067 to 0070 of JP2010-231843A can be referred to. For example, a coating layer of the magnetic layer forming composition can be subjected to an orientation treatment in an orientation zone while the coating layer is in a wet state. For the orientation treatment, the various well-known technologies including a description disclosed in a paragraph 0052 of JP2010-24113A can be used. For example, a vertical orientation treatment can be performed by a well-known method such as a method using a polar opposing magnet. In the orientation zone, a drying speed of the coating layer can be controlled depending on a temperature of dry air and an air volume and/or a transportation speed in the orientation zone. Further, the coating layer may be preliminarily dried before the transportation to the orientation zone.

Through various processes, a long magnetic tape original roll can be obtained. The obtained magnetic tape original roll is cut (slit) by a well-known cutter to have a width of the magnetic tape to be wound around the reel hub of the magnetic tape cartridge. The width is determined in accordance with the standard, and is typically ½ inches. ½ inches=12.65 mm.

A servo pattern is usually formed on the magnetic tape obtained by slitting. Details of the servo pattern will be described below.

Heat Treatment

In an aspect, the magnetic tape can be a magnetic tape manufactured through the following heat treatment. In addition, in another aspect, it can be a magnetic tape manufactured without undergoing the following heat treatment.

As the heat treatment, a magnetic tape that is cut to have a width determined in accordance with a standard by slitting is wound around a core-shaped member and subjected to a heat treatment in a wound state.

In an aspect, the above heat treatment is performed in a state where the magnetic tape is wound around a core-shaped member for heat treatment (hereinafter, referred to as a "winding core for heat treatment"), the magnetic tape after the heat treatment is wound around a cartridge reel of the magnetic tape cartridge, and the magnetic tape cartridge in which the magnetic tape is wound around the cartridge reel can be manufactured.

The winding core for heat treatment can be made of metal, resin, paper, or the like. The material of the winding core for heat treatment is preferably a material having high rigidity from the viewpoint of suppressing occurrence of winding failure such as spoking. From this point, the winding core for heat treatment is preferably made of metal or resin. In addition, as an index of rigidity, a flexural modulus of the material of the winding core for heat treatment is preferably 0.2 GPa (Gigapascal) or more, and more preferably 0.3 GPa or more. On the other hand, since a high-rigidity material is generally expensive, the use of the winding core for heat treatment made of a material having rigidity exceeding the rigidity capable of suppressing the occurrence of winding failure leads to an increase in cost. Considering the above point, the flexural modulus of the material of the winding core for heat treatment is preferably 250 GPa or less. The flexural modulus is a value measured in accordance with international organization for standardization (ISO) 178, and the flexural modulus of various materials is well-known. In addition, the winding core for heat treatment can be a solid or hollow core-shaped member. In a case of the hollow core-shaped member, a thickness thereof is preferably 2 mm or more from the viewpoint of maintaining rigidity. In addition, the winding core for heat treatment may or may not have a flange.

It is preferable to perform the heat treatment by preparing a magnetic tape having a length equal to or longer than a length (hereinafter, referred to as a "final product length") to be finally accommodated in the magnetic tape cartridge as the magnetic tape to be wound around the winding core for heat treatment, and placing the magnetic tape under a heat treatment environment in a state of being wound around the winding core for heat treatment. The length of the magnetic tape wound around the winding core for heat treatment is equal to or longer than the final product length, and from the viewpoint of ease of winding around the winding core for heat treatment or the like, the length is preferably set to "final product length +α". This a is preferably 5 m or more from the viewpoint of ease of winding. The tension in a case of winding around the winding core for heat treatment is preferably 0.10 N or more. In addition, from the viewpoint of suppressing of occurrence of excessive deformation during manufacturing, the tension in a case of winding around the winding core for heat treatment is preferably 1.50 N or less, and more preferably 1.00 N or less. An outer diameter of the winding core for heat treatment is preferably 20 mm or more, and more preferably 40 mm or more, from the viewpoint of ease of winding and suppression of coiling (curling in the longitudinal direction). In addition, the outer diameter of the winding core for heat treatment is preferably 100 mm or less, and more preferably 90 mm or less. A width of the winding core for heat treatment need only be equal to or more than a width of the magnetic tape wound around the winding core. In addition, in a case where the magnetic tape is removed from the winding core for heat treatment after the heat treatment, it is preferable to remove the magnetic tape from the winding core for heat treatment after the magnetic tape and the winding core for heat treatment are sufficiently cooled, in order to prevent the tape from being deformed unintentionally during the removal operation. It is preferable that the removed magnetic tape is wound around another winding core (referred to as a "temporary winding core") once, and then the magnetic tape is wound around the cartridge reel (generally, an outer diameter is about 40 to 50 mm) of the magnetic tape cartridge from the temporary winding core. Therefore, the magnetic tape can be wound around the cartridge reel of the magnetic tape cartridge while maintaining a relationship between an inside and an outside of the magnetic tape with respect to the winding core for heat treatment during the heat treatment. For details of the temporary winding core and the tension in winding the magnetic tape around the winding core, the previous description regarding the winding core for heat treatment can be referred to. In an aspect in which the above heat treatment is performed on a magnetic tape having a length of "final product length+a", a length of "+a" need only be cut off at any stage. For example, in an aspect, the magnetic tape for the final product length need only be wound around the reel of the magnetic tape cartridge from the temporary winding core, and the remaining length of "+a" need only be cut off. From the viewpoint of reducing a portion to be cut off and discarded, the a is preferably 20 m or less.

A specific aspect of the heat treatment performed in a state of being wound around the core-shaped member as described above will be described below.

An atmosphere temperature at which the heat treatment is performed (hereinafter, referred to as a "heat treatment temperature") is preferably 40° C. or higher, and more preferably 50° C. or higher. On the other hand, from the viewpoint of suppressing excessive deformation, the heat treatment temperature is preferably 75° C. or lower, more preferably 70° C. or lower, and still more preferably 65° C. or lower.

A weight-basis absolute humidity of an atmosphere in which the heat treatment is performed is preferably 0.1 g/kg Dry air or more, and more preferably 1 g/kg Dry air or more. An atmosphere having a weight-basis absolute humidity in the above range is preferable because it can be prepared without using a special device for reducing moisture. On the other hand, the weight-basis absolute humidity is preferably 70 g/kg Dry air or less, and more preferably 66 g/kg Dry air or less, from the viewpoint of suppressing occurrence of dew condensation and deterioration of workability. A heat treatment time is preferably 0.3 hours or more, and more preferably 0.5 hours or more. In addition, the heat treatment time is preferably 48 hours or less from the viewpoint of production efficiency.

Servo Pattern

The term "formation of servo pattern" can also be referred to as "recording of servo signal". The dimension in the width direction of the magnetic tape can be controlled by acquiring dimension information in the width direction of the magnetic tape during running by using the servo signal and adjusting and changing the tension applied in the longitudinal direction of the magnetic tape according to the acquired dimension information.

Hereinafter, the formation of the servo pattern will be described.

The servo pattern is usually formed along the longitudinal direction of the magnetic tape. Examples of control (servo control) types using a servo signal include a timing-based servo (TBS), an amplitude servo, and a frequency servo.

As shown in European computer manufacturers association (ECMA)-319 (June 2001), a magnetic tape (generally called "LTO tape") conforming to a linear tape-open (LTO) standard employs a timing-based servo system. In this timing-based servo system, the servo pattern is formed by continuously disposing a plurality of pairs of non-parallel magnetic stripes (also referred to as "servo stripes") in the longitudinal direction of the magnetic tape. The servo system is a system that performs head tracking using servo signals. In the present invention and the present specification, the term "timing-based servo pattern" refers to a servo pattern that enables head tracking in a timing-based servo system. As described above, the reason why the servo pattern is formed of a pair of non-parallel magnetic stripes is to indicate, to a servo signal reading element passing over the servo pattern, a passing position thereof. Specifically, the pair of magnetic stripes is formed so that an interval thereof continuously changes along a width direction of the magnetic tape, and the servo signal reading element reads the interval to thereby sense a relative position between the servo pattern and the servo signal reading element. Information on this relative position enables tracking on a data track. Therefore, a plurality of servo tracks are usually set on the servo pattern along a width direction of the magnetic tape.

A servo band is formed of a servo pattern continuous in the longitudinal direction of the magnetic tape. A plurality of the servo bands are usually provided on the magnetic tape. For example, in an LTO tape, the number of the servo bands is five. Regions interposed between two adjacent servo bands are data bands. The data band is formed of a plurality of data tracks, and each data track corresponds to each servo track.

Further, in an aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

As a method for uniquely specifying the servo band, there is a method using a staggered method as shown in ECMA-319 (June 2001). In this staggered method, a group of pairs of non-parallel magnetic stripes (servo stripes) disposed continuously in plural in the longitudinal direction of the magnetic tape is recorded so as to be shifted in the longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming a servo pattern is called a servo write head. The servo write head usually has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two methods. A first method is horizontal DC erasing of applying a unidirectional magnetic field along the longitudinal direction of the magnetic tape. A second method is vertical DC erasing of applying a unidirectional magnetic field along the thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-53940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

The magnetic tape cartridge may be a magnetic tape cartridge suitable for a use form in which, after being stored in a high temperature and high humidity environment, data is recorded on the magnetic tape and/or data recorded on the magnetic tape is reproduced in a use environment in which the temperature and humidity are significantly lower than those in the storage environment within a short period of time. A temperature of the storage environment may be, for example, about 30° C. to 50° C. A humidity of the storage environment may be, for example, about 60% to 100% as a relative humidity. In addition, a temperature of the use environment may be, for example, about 15° C. to 25° C. A humidity of the use environment may be, for example, about 30% to 60% as a relative humidity. A period of time from the taking out from the storage environment to the recording of the data on the magnetic tape and/or the reproduction of data recorded on the magnetic tape in the use environment may be, for example, about 30 minutes to 2 hours.

Here, the above-described use form is merely an example, and the above-described magnetic tape cartridge is not limited to the one used in such a use form.

Magnetic Tape Apparatus

Another aspect of the present invention relates to a magnetic tape apparatus including the magnetic tape cartridge.

In the present invention and the present specification, the term "magnetic tape apparatus" means an apparatus capable of performing at least one of the recording of data on the magnetic tape or the reproduction of data recorded on the magnetic tape. Such an apparatus is generally called a drive. In an aspect, the magnetic tape apparatus can be a sliding type magnetic tape apparatus. The sliding type magnetic tape apparatus is an apparatus in which the magnetic layer surface and the magnetic head come into contact with each other to be slid on each other, in a case of performing the recording of data on the magnetic tape and/or reproduction of recorded data.

The magnetic tape apparatus can include the magnetic tape cartridge attachably and detachably. Further, the magnetic tape apparatus can include a magnetic head. Such a magnetic head can be a recording head capable of performing the recording of data on the magnetic tape, or can be a reproducing head capable of performing the reproducing of data recorded on the magnetic tape. In addition, in an aspect, the magnetic tape apparatus can include both of a recording head and a reproducing head as separate magnetic heads. In another aspect, the magnetic head included in the magnetic tape apparatus can have a configuration that both of an element for recording data (recording element) and an element for reproducing data (reproducing element) are included in one magnetic head. Hereinafter, the element for recording and the element for reproducing data are collectively referred to as an "element for data". As the reproducing head, a magnetic head (MR head) including a magnetoresistive (MR) element capable of sensitively reading data recorded on the magnetic tape as a reproducing element is preferable. As the MR head, various well-known MR heads such as an anisotropic magnetoresistive (AMR) head, a giant magnetoresistive (GMR) head, and a tunnel magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic tape apparatus. For example, a magnetic head that records data and/or reproduces recorded data (hereinafter, also referred to as a "recording and reproducing head") can include two servo signal reading elements, and the two servo signal reading elements can read two adjacent servo bands simultaneously. One or a plurality of elements for data can be disposed between the two servo signal reading elements.

In the magnetic tape apparatus, recording of data on the magnetic tape and/or reproduction of data recorded on the magnetic tape can be performed as the magnetic layer surface of the magnetic tape and the magnetic head come into contact with each other to be slid on each other. The above magnetic tape apparatus need only include the magnetic tape cartridge according to one embodiment of the present invention, and well-known technologies can be applied to others.

For example, in a case where data is recorded on the magnetic tape on which a servo pattern is formed and/or recorded data is reproduced, first, tracking is performed using a servo signal obtained by reading the servo pattern. That is, by causing the servo signal reading element to follow a predetermined servo track, the element for data is controlled to pass on the target data track. Displacement of the data track is performed by changing a servo track to be read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

In an aspect, the dimension in the width direction of the magnetic tape can be controlled by acquiring dimension information in the width direction of the magnetic tape during running by using the servo signal and adjusting the tension applied in the longitudinal direction of the magnetic tape according to the acquired dimension information. Such tension adjustment can contribute to preventing the magnetic head for recording or reproducing data from being deviated from a target track position due to width deformation of the magnetic tape during recording or reproduction.

EXAMPLES

Hereinafter, an aspect of the present invention will be described based on Examples. Here, the present invention is not limited to aspects shown in Examples. Unless otherwise specified, "parts" and "%" in the following description indicate "parts by mass" and "mass %". "eq" is an equivalent and is a unit that cannot be converted into an SI unit.

The following various processes and operations were performed in an environment of a temperature of 20° C.±25° C. and a relative humidity of 40% to 60%, unless otherwise noted.

Non-Magnetic Support

In Table 1, "PEN" indicates a polyethylene naphthalate support, and "PET" indicates a polyethylene terephthalate support.

Ferromagnetic Powder

In Table 1, "BaFe" in the row of the type of a ferromagnetic powder indicates a hexagonal barium ferrite powder having an average particle size (average plate diameter) of 21 nm.

In Table 1, "SrFe1" in the row of the type of a ferromagnetic powder indicates a hexagonal strontium ferrite powder manufactured by the following method.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a pair of water-cooling rollers to manufacture an amorphous body.

280 g of the manufactured amorphous body was charged into an electric furnace, was heated to 635° C. (crystallization temperature) at a heating rate of 3.5° C./min, and was held at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an internal temperature of the furnace of 110° C. for 6 hours to obtain a hexagonal strontium ferrite powder.

The hexagonal strontium ferrite powder obtained above had an average particle size of 18 nm, an activation volume of 902 $nm^3$, an anisotropy constant Ku of $2.2 \times 10^5$ $J/m^3$, and a mass magnetization σs of 49 $A \cdot m^2/kg$.

12 mg of a sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of a sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio of the surface layer portion content to the bulk content, that is, "surface layer portion content/bulk content" was 2.8, and the neodymium atoms were unevenly distributed in the surface layer of particles.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M-type). A crystal phase detected by X-ray diffraction analysis was a single phase of a magnetoplumbite type.

PANalytical X'Pert Pro diffractometer, PIXcel detector

Soller slit of incident beam and diffracted beam: 0.017 radians

Fixed angle of dispersion slit: ¼ degrees

Mask: 10 mm

Anti-scattering slit: ¼ degrees

Measurement mode: continuous

Measurement time per stage: 3 seconds

Measurement speed: 0.017 degrees per second

Measurement step: 0.05 degrees

In Table 1, "SrFe2" in the row of the type of a ferromagnetic powder indicates a hexagonal strontium ferrite powder manufactured by the following method.

1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed by a mixer to obtain a raw material mixture.

The obtained raw material mixture was dissolved in a platinum crucible at a melting temperature of 1380° C., and a hot water outlet provided at a bottom of the platinum crucible was heated while stirring a melt, and the melt was discharged in a rod shape at about 6 g/sec. Hot water was rolled and quenched by a pair of water-cooling rollers to manufacture an amorphous body.

280 g of the obtained amorphous body was charged into an electric furnace, was heated to 645° C. (crystallization temperature), and was held at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an internal temperature of the furnace of 110° C. for 6 hours to obtain a hexagonal strontium ferrite powder.

The obtained hexagonal strontium ferrite powder had an average particle size of 19 nm, an activation volume of 1102 nm$^3$, an anisotropy constant Ku of 2.0×10$^5$ J/m$^3$, and a mass magnetization σs of 50 A·m$^2$/kg.

In Table 1, "ε-Iron oxide" in the row of the type of a ferromagnetic powder indicates an ε-iron oxide powder manufactured by the following method.

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid aqueous solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. A powder sedimented by adding 50 g of ammonium sulfate to the obtained reaction solution was collected by centrifugal separation, was washed with pure water, and was dried in a heating furnace at a furnace temperature of 80° C. for 24 hours to obtain a ferromagnetic powder precursor.

The obtained ferromagnetic powder precursor was mounted on a heating furnace at a furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was confirmed by high-frequency inductively coupled plasma-optical emission spectrometry (ICP-OES) has Ga, Co, and a Ti substitution type ε-iron oxide (ε-Ga$_{0.28}$Co$_{0.05}$Ti$_{0.05}$Fe$_{1.62}$O$_3$). In addition, X-ray diffraction analysis was performed under the same condition as described above for the hexagonal strontium ferrite powder SrFe1, and from a peak of an X-ray diffraction pattern, it was confirmed that the obtained ferromagnetic powder does not include α-phase and γ-phase crystal structures, and has a single-phase and ε-phase crystal structure (ε-iron oxide type crystal structure).

The obtained ε-iron oxide powder had an average particle size of 12 nm, an activation volume of 746 nm$^3$, an anisotropy constant Ku of 1.2×10$^5$ J/m$^3$, and a mass magnetization as of 16 A·m$^2$/kg.

An activation volume and an anisotropy constant Ku of the above hexagonal strontium ferrite powder and ε-iron oxide powder are values obtained by the method described above using a vibrating sample magnetometer (manufactured by Toei Industry Co., Ltd.) for each ferromagnetic powder.

A mass magnetization as is a value measured at a magnetic field intensity of 1194 kA/m (15 kOe) using a vibrating sample magnetometer (manufactured by Toei Industry Co., Ltd.).

Example 1

Manufacturing of Magnetic Tape Cartridge (1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a SO$_3$Na group as a polar group (UR-4800 manufactured by Toyobo Co., Ltd. (amount of a polar group: 80 meq/kg)), and 570.0 parts of a mixed solution of methyl ethyl ketone and cyclohexanone at 1:1 (mass ratio) as a solvent were mixed with respect to 100.0 parts of an alumina powder (HIT-80 manufactured by Sumitomo Chemical Co., Ltd.) having a pregelatinization ratio of about 65% and a Brunauer-Emmett-Teller (BET) specific surface area of 20 m$^2$/g, and dispersed in the presence of zirconia beads by a paint shaker for 5 hours. After the dispersion, the dispersion liquid and the beads were separated by a mesh to obtain an alumina dispersion.

(2) Formulation of Magnetic Layer Forming Composition

| Magnetic Liquid | |
|---|---|
| Ferromagnetic powder (see Table 1) | 100.0 parts |
| SO$_3$Na group-containing polyurethane resin weight-average molecular weight: 70,000, SO$_3$Na group: | 14.0 parts 0.2 meq/g |
| Cyclohexanone: | 150.0 parts |
| Methyl ethyl ketone: | 150.0 parts |

-continued

Abrasive Liquid

| | |
|---|---|
| Alumina dispersion prepared in (1) above | 6.0 parts |

Silica Sol (Protrusion Forming Agent Liquid)

| | |
|---|---|
| Colloidal silica (average particle size: 120 nm) | 2.0 parts |
| Methyl ethyl ketone | 1.4 parts |

Other Components

| | |
|---|---|
| Stearic acid | 2.0 parts |
| Stearic acid amide | 0.2 parts |
| Butyl stearate | 2.0 parts |
| Polyisocyanate (CORONATE (registered trademark) L manufactured by Tosoh Corporation) | 2.5 parts |

Finishing Additive Solvent

| | |
|---|---|
| Cyclohexanone | 200.0 parts |
| Methyl ethyl ketone | 200.0 parts |

(3) Formulation of Non-Magnetic Layer Forming Composition

| | |
|---|---|
| Non-magnetic inorganic powder: α-iron oxide: Average particle size (average long axis length): 0.15 μm Average acicular ratio: 7 BET specific surface area: 52 m$^2$/g | 100.0 parts |
| Carbon black Average particle size: 20 nm | 20.0 parts |
| SO$_3$Na group-containing polyurethane resin weight-average molecular weight: 70,000, SO$_3$Na group: | 18.0 parts 0.2 meq/g |
| Stearic acid | 2.0 parts |
| Stearic acid amide | 0.2 parts |
| Butyl stearate | 2.0 parts |
| Cyclohexanone | 300.0 parts |
| Methyl ethyl ketone | 300.0 parts |

(4) Formulation of Back Coating Layer Forming Composition

| | |
|---|---|
| Carbon black | 100.0 parts |
| Dibutyl phthalate (DBP) oil absorption | 74 cm$^3$/100 g |
| Nitrocellulose | 27.0 parts |
| Polyester polyurethane resin containing sulfonic acid group and/or salt thereof | 62.0 parts |
| Polyester resin | 4.0 parts |
| Alumina powder (BET specific surface area: 17 m$^2$/g) | 0.6 parts |
| Methyl ethyl ketone | 600.0 parts |
| Toluene | 600.0 parts |
| Polyisocyanate (CORONATE L manufactured by Tosoh Corporation) | 15.0 parts |

(5) Preparation of Each Layer Forming Composition

A magnetic layer forming composition was prepared by the following method.

Various components of the magnetic liquid were dispersed (bead dispersion) for 24 hours using a batch type vertical sand mill to prepare a magnetic liquid. As dispersed beads, zirconia beads having a bead diameter of 0.5 mm were used. Using the sand mill, the prepared magnetic liquid, the abrasive liquid, and other components (silica sol, other components, and finishing additive solvent) were mixed and bead-dispersed for 5 minutes, and then subjected to a treatment (ultrasonic dispersion) for 0.5 minutes by a batch type ultrasonic device (20 kHz, 300 W). Thereafter, filtration was performed using a filter having a pore diameter of 0.5 μm to prepare a magnetic layer forming composition.

A non-magnetic layer forming composition was prepared by the following method. The components excluding a lubricant (stearic acid, stearic acid amide, and butyl stearate) were kneaded and diluted by an open kneader, and then subjected to a dispersion treatment by a horizontal beads mill dispersing device. After that, the lubricant (stearic acid, stearic acid amide, and butyl stearate) was added into the obtained dispersion liquid and stirred and mixed by a dissolver stirrer to prepare a non-magnetic layer forming composition.

A back coating layer forming composition was prepared by the following method. The above components excluding polyisocyanate were introduced into a dissolver stirrer, stirred at a circumferential speed of 10 msec for 30 minutes, and then subjected to a dispersion treatment by a horizontal beads mill dispersing device. After that, polyisocyanate was added into the obtained dispersion liquid and stirred and mixed by a dissolver stirrer to prepare a back coating layer forming composition.

(6) Method of Manufacturing of Magnetic Tape and Magnetic Tape Cartridge

The non-magnetic layer forming composition prepared in (5) above was applied onto a surface of a biaxially stretched support of the type and thickness shown in Table 1 and was dried so that the thickness after drying is a value shown in Table 1, and thus a non-magnetic layer was formed. Next, the magnetic layer forming composition prepared in (5) above was applied onto the non-magnetic layer so that the thickness after drying is a value shown in Table 1, and thus a coating layer was formed. After that, while this coating layer of the magnetic layer forming composition is in a wet state, a vertical orientation treatment was performed by applying a magnetic field of a magnetic field intensity of 0.3 T in a direction perpendicular to a surface of the coating layer, and then the surface of the coating layer was dried. Thereby, a magnetic layer was formed. After that, the back coating layer forming composition prepared in (5) above was applied onto a surface of the support opposite to the surface on which the non-magnetic layer and the magnetic layer are formed and was dried so that the thickness after drying is a thickness shown in Table 1, and thus, a back coating layer was formed.

After that, a surface smoothing treatment (calendering treatment) was performed using a calendar roll formed of only metal rolls at a speed of 100 m/min, a linear pressure of 300 kg/cm, and a calendar temperature of 90° C. (surface temperature of calendar roll).

After that, a long magnetic tape original roll was stored in a heat treatment furnace having an atmosphere temperature of 70° C. to perform a heat treatment (heat treatment time: 36 hours). After the heat treatment, the magnetic tape original roll was slit to obtain a magnetic tape having ½ inches width. The slitting was performed in a slitting device having a configuration shown in FIG. 4 of JP2002-269711A. A cycle of a sucking section of the slitting device was 13.5 mm, and a porous metal was embedded in the sucking section to form a mesh suction. A driving belt and a coupling material of a power transmission device that transmits power to a blade drive unit of the slitting device were used as shown in Table 1, and slitting was performed using a sucking pressure, a winding angle of a magnetic tape original roll with respect to a tension cut roller, and a slitting speed as values shown in Table 1.

After the slitting, a servo signal was recorded on the magnetic layer of the obtained magnetic tape by a commercially available servo writer to obtain a magnetic tape having a data band, a servo band, and a guide band in an arrangement according to a linear tape-open (LTO) Ultrium format and having a servo pattern (timing-based servo pattern) in an arrangement and a shape according to the LTO Ultrium format on the servo band. The servo pattern thus formed is a servo pattern according to the description in Japanese industrial standards (JIS) X6175:2006 and Standard ECMA-319 (June 2001).

The magnetic tape (length of 960 m) after recording the servo signal was wound around a winding core for heat treatment, and was heat-treated in a state of being wound around the core. As the winding core for heat treatment, a resin-made solid core-shaped member (outer diameter: 50 mm) having a flexural modulus of 0.8 GPa was used, and the tension during winding was 0.60 N. The heat treatment was performed at a heat treatment temperature of 55° C. for 5 hours. A weight-basis absolute humidity of the heat-treated atmosphere was 10 g/kg Dry air.

After the above heat treatment, the magnetic tape and the winding core for heat treatment were sufficiently cooled, and then the magnetic tape was removed from the winding core for heat treatment and wound around the temporary winding core. After that, the magnetic tape of the final product length (950 m) was wound (winding tension: see Table 1) around the reel (reel outer diameter: 44 mm) of the magnetic tape cartridge (LTO Ultrium 7 data cartridge) from the temporary winding core, the remaining 10 m was cut off, and a leader tape (length of 1 m) according to item 9 of Section 3 of European computer manufacturers association (ECMA)-319 (June 2001) was joined to the end of the cutting side by a commercially available splicing tape. As the temporary winding core, a solid core-shaped member made of the same material and having the same outer diameter as the winding core for heat treatment was used, and the tension during winding was 0.60 N.

As described above, a single reel type magnetic tape cartridge of Example 1 in which a magnetic tape having a total length of 951 m including a leader tape was wound around a reel was manufactured.

By repeating the above processes, a plurality of magnetic tape cartridges were manufactured and used for the following (7) to (10), respectively.

(7) Measurement of Water Absorption Amount

A water absorption amount for the magnetic tape cartridge, which was measured in terms of the length of the magnetic tape of 1000 m, after the magnetic tape cartridge was stored in a storage environment of a temperature of 32° C. and a relative humidity of 80% for 10 days was obtained by the method described above. The mass of the magnetic tape cartridge was measured using a UX2200H manufactured by Shimadzu Corporation.

(8) Edge Weave Amount α and Cycle f

An edge weave amount measuring device (manufactured by Keyence Corporation) was attached to a commercially available servo writer, and the edge weave amount was continuously measured over a tape length of 50 m at the tape edge on one side serving as the running reference side. Fourier analysis of the obtained edge weave amount α was performed to obtain the cycle f of the edge weave.

(9) Tape Thickness 10 tape samples (length of 5 cm) were cut out from any part of the magnetic tape taken out from each magnetic tape cartridge, and the thickness was measured by stacking these tape samples. The thickness was measured using a digital thickness gauge of Millimar 1240 compact amplifier and Millimar 1301 induction probe manufactured by Mahr Inc. A value (thickness per tape sample) obtained by dividing the measured thickness by 1/10 was defined as the tape thickness.

(10) Friction Coefficient

In order to evaluate the friction characteristics in a state of being exposed to environmental change from a high temperature and high humidity environment to an environment with lower temperature and humidity within a short period of time, the friction coefficient was obtained by the following method.

The magnetic tape cartridge was placed in a measurement environment with a temperature of 21° C. and a relative humidity of 50% for 5 days or more and allowed to acclimatize to the measurement environment.

The magnetic tape cartridge was stored in a storage environment with a temperature of 32° C. and a relative humidity of 80% for 10 days.

Within 1 hour after the above storage, the friction coefficient with respect to the magnetic head was obtained by the following method in a measurement environment with a temperature of 21° C. and a relative humidity of 50%. As the magnetic head, a linear tape-open (LTO) 8 head manufactured by IBM Corporation was used.

The magnetic tape taken out from the magnetic tape cartridge was placed on two cylindrical guide rolls having a diameter of 1 inch (1 inch=2.54 cm) spaced apart from each other and arranged in parallel with each other such that the magnetic layer surface thereof was in contact with the guide rolls. In a randomly extracted portion of the magnetic tape to be measured, the magnetic layer surface of the magnetic tape was slid with respect to the LTO8 head, and a resistance force generated during the sliding was detected by a strain gauge. Reciprocating sliding was performed 100 times. Regarding measurement conditions, a lap angle θ was 6° and a sliding speed was 30 mm/sec. The tension applied in the longitudinal direction of the magnetic tape during the sliding was set to 1.50 N. A sliding distance for each of a forward path and a return path was set to 5 cm. A friction coefficient (dynamic friction coefficient) in the 100th forward path was obtained. In a case of the above measurement, one end of both ends of the magnetic tape to be measured in the longitudinal direction was connected to the strain gauge, and a tension of 1.50 N was applied to the other end. Assuming that the tension applied here was $T_0$ (unit: N) and the resistance force detected by the strain gauge is T (unit: N), the friction coefficient μ value was calculated by the following equation. That is, the friction coefficient μ value was calculated with $T_0=1.50$.

$$\mu = \frac{1}{\theta \times (\pi/180)} \times \log_e \frac{T}{T_0}$$

Examples 2 to 36 and Comparative Examples 1 to 15

A magnetic tape cartridge was manufactured and various evaluations were performed in the same manner as in Example 1 except that the items in Table 1 were changed as shown in Table 1.

In Examples in which "Performed" is described in the row of "Direct drive" in Table 1, the blade drive unit was directly driven by a motor to perform slitting without using a power transmission device using a belt. In addition, in Comparative Examples in which "No mesh" is described in the row of "Sucking section", slitting was performed without embedding the porous metal in the sucking section of the slitting device.

The above results are shown in Table 1 (Tables 1-1 to 1-6).

TABLE 1-1

|  | Example 1 | Example 2 | Example 3 | Example 4 | Example 5 | Example 6 | Example 7 | Example 8 | Example 9 |
|---|---|---|---|---|---|---|---|---|---|
| Type of ferromagnetic powder | BaFe | BaFe | BaFe | BaFe | BaFe | BaFe | BaFe | BaFe | BaFe |
| Thickness of magnetic layer | 0.1 μm | 0.1 μm | 0.1 μm | 0.1 μm | 0.1 μm | 0.1 μm | 0.1 μm | 0.1 μm | 0.1 μm |
| Thickness of non-magnetic layer | 1.0 μm | 1.0 μm | 1.0 μm | 1.0 μm | 1.0 μm | 1.0 μm | 1.0 μm | 1.0 μm | 1.0 μm |
| Thickness of non-magnetic support | 4.0 μm | 4.0 μm | 4.0 μm | 4.0 μm | 4.0 μm | 4.0 μm | 4.0 μm | 4.0 μm | 4.0 μm |
| Thickness of back coating layer | 0.5 μm | 0.5 μm | 0.5 μm | 0.5 μm | 0.5 μm | 0.5 μm | 0.5 μm | 0.5 μm | 0.5 μm |
| Tape thickness | 5.6 μm | 5.6 μm | 5.6 μm | 5.6 μm | 5.6 μm | 5.6 μm | 5.6 μm | 5.6 μm | 5.6 μm |
| Type of non-magnetic support | PET | PET | PET | PET | PET | PET | PET | PET | PET |
| Young's modulus of non-magnetic support Width direction (MPa) | 4000 | 4000 | 4000 | 4000 | 4000 | 4000 | 4000 | 4000 | 3500 |
| Young's modulus of non-magnetic support Longitudinal direction direction (MPa) | 7000 | 7000 | 7000 | 7000 | 7000 | 7000 | 7000 | 7000 | 7000 |
| Moisture content of non-magnetic support | 0.50% | 0.50% | 0.50S | 0.50% | 0.50% | 0.50% | 0.50% | 0.50% | 0.50% |
| Sucking section | Mesh | Mesh | Mesh | Mesh | Mesh | Mesh | Mesh | Mesh | Mesh |
| Sucking pressure (×1000 Pa) | 13.3 | 13.3 | 13.3 | 13.3 | 13.3 | 13.3 | 13.3 | 13.3 | 13.3 |
| Winding angle | 188 degrees | 188 degrees | 188 degrees | 188 degrees | 188 degrees | 188 degrees | 188 degrees | 188 degrees | 188 degrees |
| Driving belt | Flat belt | Flat belt | — | Flat belt | Flat belt | Flat belt | — | — | Flat belt |
| Coupling material | Rubber | Vibrationproof rubber | — | Rubber | Vibrationproof rubber | Vibrationproof rubber | — | — | Rubber |
| Direct drive | — | — | Performed | — | — | — | Performed | Performed | — |
| Slitting speed (m/min) | 200 | 200 | 200 | 300 | 300 | 400 | 300 | 400 | 200 |
| Cycle f | 65.0 mm | 65.0 mm | 65.0 mm | 98.0 mm | 98.0 mm | 130.0 mm | 98.0 mm | 130.0 mm | 65.0 mm |
| Edge weave amount α | 1.5 μm | 1.3 μm | 0.8 μm | 1.5 μm | 1.3 μm | 1.3 μm | 0.8 μm | 0.8 μm | 1.5 μm |
| Winding tension | 1.00N | 1.00N | 1.00N | 1.00N | 1.00N | 1.00N | 1.00N | 1.00N | 1.00N |
| Water absorption amount | 0.30 g | 0.30 g | 0.30 g | 0.30 g | 0.30 g | 0.30 g | 0.30 g | 0.30 g | 0.30 g |
| Friction coefficient | 0.5 | 0.5 | 0.5 | 0.5 | 0.5 | 0.5 | 0.5 | 0.5 | 0.5 |

TABLE 1-2

|  | Example 10 | Example 11 | Example 12 | Example 13 | Example 14 | Example 15 | Example 16 | Example 17 | Example 18 |
|---|---|---|---|---|---|---|---|---|---|
| Type of ferromagnetic powder | BaFe | BaFe | BaFe | BaFe | BaFe | BaFe | SrFe1 | SrFe2 | ε-Iron oxide |
| Thickness of magnetic layer | 0.1 μm | 0.1 μm | 0.1 μm | 0.1 μm | 0.1 μm | 0.1 μm | 0.1 μm | 0.1 μm | 0.1 μm |
| Thickness of non-magnetic layer | 1.0 μm | 1.0 μm | 1.0 μm | 1.0 μm | 1.0 μm | 0.9 μm | 0.9 μm | 0.9 μm | 0.9 μm |
| Thickness of non-magnetic support | 4.0 μm | 4.0 μm | 4.0 μm | 4.0 μm | 4.0 μm | 3.8 μm | 3.8 μm | 3.8 μm | 3.8 μm |
| Thickness of back coating layer | 0.5 μm | 0.5 μm | 0.5 μm | 0.5 μm | 0.2 μm | 0.2 μm | 0.2 μm | 0.2 μm | 0.2 μm |
| Tape thickness | 5.6 μm | 5.6 μm | 5.6 μm | 5.6 μm | 5.3 μm | 5.0 μm | 5.0 μm | 5.0 μm | 5.0 μm |
| Type of non-magnetic support | PET | PET | PET | PET | PET | PET | PET | PET | PET |
| Young's modulus of non-magnetic support Width direction (MPa) | 4000 | 4000 | 4000 | 4000 | 4000 | 4000 | 4000 | 4000 | 4000 |
| Young's modulus of non-magnetic support Longitudinal direction direction (MPa) | 7000 | 7000 | 7000 | 7000 | 7000 | 7000 | 7000 | 7000 | 7000 |
| Moisture content of non-magnetic support | 0.20% | 0.50% | 0.50% | 0.20% | 0.20% | 0.20% | 0.20% | 0.20% | 0.20% |
| Sucking section | Mesh | Mesh | Mesh | Mesh | Mesh | Mesh | Mesh | Mesh | Mesh |
| Sucking pressure (×1000 Pa) | 13.3 | 13.3 | 13.3 | 13.3 | 13.3 | 13.3 | 13.3 | 13.3 | 13.3 |
| Winding angle | 188 degrees | 188 degrees | 188 degrees | 188 degrees | 188 degrees | 188 degrees | 188 degrees | 188 degrees | 188 degrees |
| Driving belt | Flat belt | Flat belt | Flat belt | Flat belt | Flat belt | Flat belt | Flat belt | Flat belt | Flat belt |
| Coupling material | Rubber | Rubber | Rubber | Rubber | Rubber | Rubber | Rubber | Rubber | Rubber |
| Direct drive | — | — | — | — | — | — | — | — | — |
| Slitting speed (m/min) | 200 | 200 | 200 | 200 | 200 | 200 | 200 | 200 | 200 |
| Cycle f | 65.0 mm | 65.0 mm | 65.0 mm | 65.0 mm | 65.0 mm | 65.0 mm | 65.0 mm | 65.0 mm | 65.0 mm |
| Edge weave amount α | 1.5 μm | 1.5 μm | 1.5 μm | 1.5 μm | 1.5 μm | 1.5 μm | 1.5 μm | 1.5 μm | 1.5 μm |

TABLE 1-2-continued

|  | Example 10 | Example 11 | Example 12 | Example 13 | Example 14 | Example 15 | Example 16 | Example 17 | Example 18 |
|---|---|---|---|---|---|---|---|---|---|
| Winding tension | 1.00N | 1.50N | 0.80N | 1.50N | 1.50N | 1.50N | 1.50N | 1.50N | 1.50N |
| Water absorption amount | 0.30 g | 0.10 g | 0.30 g | 0.10 g | 0.10 g | 0.10 g | 0.10 g | 0.10 g | 0.10 g |
| Friction coefficient | 0.4 | 0.3 | 0.6 | 0.3 | 0.3 | 0.3 | 0.3 | 0.3 | 0.3 |

TABLE 1-3

|  | Example 19 | Example 20 | Example 21 | Example 22 | Example 23 | Example 24 | Example 25 | Example 26 | Example 27 |
|---|---|---|---|---|---|---|---|---|---|
| Type of ferromagnetic powder | BaFe | BaFe | BaFe | BaFe | BaFe | BaFe | BaFe | BaFe | BaFe |
| Thickness of magnetic layer | 0.1 μm | 0.1 μm | 0.1 μm | 0.1 μm | 0.1 μm | 0.1 μm | 0.1 μm | 0.1 μm | 0.1 μm |
| Thickness of non-magnetic layer | 1.0 μm | 1.0 μm | 1.0 μm | 1.0 μm | 1.0 μm | 1.0 μm | 1.0 μm | 1.0 μm | 1.0 μm |
| Thickness of non-magnetic support | 4.0 μm | 4.0 μm | 4.0 μm | 4.0 μm | 4.0 μm | 4.0 μm | 4.0 μm | 4.0 μm | 4.0 μm |
| Thickness of back coating layer | 0.5 μm | 0.5 μm | 0.5 μm | 0.5 μm | 0.5 μm | 0.5 μm | 0.5 μm | 0.5 μm | 0.5 μm |
| Tape thickness | 5.6 μm | 5.6 μm | 5,6 μm | 5.6 μm | 5.6 μm | 5.6 μm | 5.6 μm | 5.6 μm | 5.6 μm |
| Type of non-magnetic support | PEN | PEN | PEN | PEN | PEN | PEN | PEN | PEN | PEN |
| Young's modulus of non-magnetic support Width direction (MPa) | 4000 | 4000 | 4000 | 4000 | 4000 | 4000 | 4000 | 4000 | 4000 |
| Young's modulus of non-magnetic support Longitudinal direction direction (MPa) | 8000 | 8000 | 8000 | 8000 | 8000 | 8000 | 8000 | 8000 | 7000 |
| Moisture content of non-magnetic support | 0.60% | 0.60% | 0.60% | 0.60% | 0.60% | 0.60% | 0.60% | 0.60% | 0.50% |
| Sucking section | Mesh | Mesh | Mesh | Mesh | Mesh | Mesh | Mesh | Mesh | Mesh |
| Sucking pressure (×1000 Pa) | 13.3 | 13.3 | 13.3 | 13.3 | 13.3 | 13.3 | 13.3 | 13.3 | 13.3 |
| Winding angle | 188 degrees | 188 degrees | 188 degrees | 188 degrees | 188 degrees | 188 degrees | 188 degrees | 188 degrees | 188 degrees |
| Driving belt | Flat belt | Flat belt | — | Flat belt | Flat belt | Flat belt | — | — | Flat belt |
| Coupling material | Rubber | Vibrationproof rubber | — | Rubber | Vibrationproof rubber | Vibrationproof rubber | — | — | Rubber |
| Direct drive | — | — | Performed | — | — | — | Performed | Performed | — |
| Slitting speed (m/min) | 200 | 200 | 200 | 300 | 300 | 400 | 300 | 400 | 200 |
| Cycle f | 65.0 mm | 65.0 mm | 65.0 mm | 98.0 mm | 98.0 mm | 130.0 mm | 98.0 mm | 130.0 mm | 65.0 mm |
| Edge weave amount α | 1.5 μm | 1.3 μm | 0.8 μm | 1.5 μm | 1.3 μm | 1.3 μm | 0.8 μm | 0.8 μm | 1.5 μm |
| Winding tension | 1.00N | 1.00N | 1.00N | 1.00N | 1.00N | 1.00N | 1.00N | 1.00N | 1.00N |
| Water absorption amount | 0.30 g | 0.30 g | 0.30 g | 0.30 g | 0.30 g | 0.30 g | 0.30 g | 0.30 g | 0.30 g |
| Friction coefficient | 0.5 | 0.5 | 0.5 | 0.5 | 0.5 | 0.5 | 0.5 | 0.5 | 0.5 |

TABLE 1-4

|  | Example 28 | Example 29 | Example 30 | Example 31 | Example 32 | Example 33 | Example 34 | Example 35 | Example 36 |
|---|---|---|---|---|---|---|---|---|---|
| Type of ferromagnetic powder | BaFe | BaFe | BaFe | BaFe | BaFe | BaFe | SrFe1 | SrFe2 | ε-Iron oxide |
| Thickness of magnetic layer | 0.1 μm | 0.1 μm | 0.1 μm | 0.1 μm | 0.1 μm | 0.1 μm | 0.1 μm | 0.1 μm | 0.1 μm |
| Thickness of non-magnetic layer | 1.0 μm | 1.0 μm | 1.0 μm | 1.0 μm | 1.0 μm | 0.9 μm | 0.9 μm | 0.9 μm | 0.9 μm |
| Thickness of non-magnetic support | 4.0 μm | 4.0 μm | 4.0 μm | 4.0 μm | 4.0 μm | 3.8 μm | 3.8 μm | 3.8 μm | 3.8 μm |
| Thickness of back coating layer | 0.5 μm | 0.5 μm | 0.5 μm | 0.5 μm | 0.2 μm | 0.2 μm | 0.2 μm | 0.2 μm | 0.2 μm |
| Tape thickness | 5.6 μm | 5.6 μm | 5.6 μm | 5.6 μm | 5.3 μm | 5.0 μm | 5.0 μm | 5.0 μm | 5.0 μm |
| Type of non-magnetic support | PEN | PEN | PEN | PEN | PEN | PEN | PEN | PEN | PEN |
| Young's modulus of non-magnetic support Width direction (MPa) | 4000 | 4000 | 4000 | 4000 | 4000 | 4000 | 4000 | 4000 | 4000 |
| Young's modulus of non-magnetic support Longitudinal direction direction (MPa) | 7000 | 8000 | 8000 | 7000 | 7000 | 7000 | 7000 | 7000 | 7000 |
| Moisture content of non-magnetic support | 0.20% | 0.60% | 0.60% | 0.20% | 0.20% | 0.20% | 0.20% | 0.20% | 0.20% |
| Sucking section | Mesh | Mesh | Mesh | Mesh | Mesh | Mesh | Mesh | Mesh | Mesh |
| Sucking pressure (×1000 Pa) | 13.3 | 13.3 | 13.3 | 13.3 | 13.3 | 13.3 | 13.3 | 13.3 | 13.3 |

TABLE 1-4-continued

|  | Example 28 | Example 29 | Example 30 | Example 31 | Example 32 | Example 33 | Example 34 | Example 35 | Example 36 |
|---|---|---|---|---|---|---|---|---|---|
| Winding angle | 188 degrees | 188 degrees | 188 degrees | 188 degrees | 188 degrees | 188 degrees | 188 degrees | 188 degrees | 188 degrees |
| Driving belt | Flat belt | Flat belt | Flat belt | Flat belt | Flat belt | Flat belt | Flat belt | Flat belt | Flat belt |
| Coupling material | Rubber | Rubber | Rubber | Rubber | Rubber | Rubber | Rubber | Rubber | Rubber |
| Direct drive | — | — | — | — | — | — | — | — | — |
| Slitting speed (m/min) | 200 | 200 | 200 | 200 | 200 | 200 | 200 | 200 | 200 |
| Cycle f | 65.0 mm | 65.0 mm | 65.0 mm | 65.0 mm | 65.0 mm | 65.0 mm | 65.0 mm | 65.0 mm | 65.0 mm |
| Edge weave amount α | 1.5 μm | 1.5 μm | 1.5 μm | 1.5 μm | 1.5 μm | 1.5 μm | 1.5 μm | 1.5 μm | 1.5 μm |
| Winding tension | 1.00N | 1.50N | 0.80N | 1.50N | 1.50N | 1.50N | 1.50N | 1.50N | 1.50N |
| Water absorption amount | 0.30 g | 0.10 g | 0.30 g | 0.10 g | 0.10 g | 0.10 g | 0.10 g | 0.10 g | 0.10 g |
| Friction coefficient | 0.4 | 0.3 | 0.6 | 0.3 | 0.3 | 0.3 | 0.3 | 0.3 | 0.3 |

TABLE 1-5

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Type of ferromagnetic powder | BaFe | BaFe | BaFe | BaFe | BaFe | BaFe | BaFe | BaFe | BaFe |
| Thickness of magnetic layer | 0.1 μm | 0.1 μm | 0.1 μm | 0.1 μm | 0.1 μm | 0.1 μm | 0.1 μm | 0.1 μm | 0.1 μm |
| Thickness of non-magnetic layer | 1.0 μm | 1.0 μm | 1.0 μm | 1.0 μm | 1.0 μm | 1.0 μm | 1.0 μm | 1.0 μm | 1.0 μm |
| Thickness of non-magnetic support | 4.0 μm | 4.0 μm | 4.0 μm | 4.0 μm | 4.0 μm | 4.0 μm | 4.0 μm | 4.0 μm | 4.0 μm |
| Thickness of back coating layer | 0.5 μm | 0.5 μm | 0.5 μm | 0.5 μm | 0.5 μm | 0.5 μm | 0.5 μm | 0.5 μm | 0.2 μm |
| Tape thickness | 5.6 μm | 5.6 μm | 5.6 μm | 5.6 μm | 5.6 μm | 5.6 μm | 5.6 μm | 5.6 μm | 5.3 μm |
| Type of non-magnetic support | PET | PET | PET | PET | PET | PET | PET | PET | PET |
| Young's modulus of non-magnetic support Width direction (MPa) | 7000 | 6800 | 5000 | 7000 | 7000 | 7000 | 7000 | 7000 | 7000 |
| Young's modulus of non-magnetic support Longitudinal direction direction (MPa) | 4000 | 4000 | 6000 | 4000 | 4000 | 4000 | 4000 | 4000 | 4000 |
| Moisture content of non-magnetic support | 2.00% | 2.00% | 2.00% | 1.00% | 2.00% | 2.00% | 2.00% | 2.00% | 2.00% |
| Sucking section | No mesh | No mesh | No mesh | No mesh | No mesh | Mesh | No mesh | No mesh | No mesh |
| Sucking pressure (×1000 Pa) | 1.33 | 1.33 | 1.33 | 1.33 | 1.33 | 13.3 | 1.33 | 1.33 | 1.33 |
| Winding angle | 188 degrees | 188 degrees | 188 degrees | 188 degrees | 188 degrees | 188 degrees | 188 degrees | 188 degrees | 188 degrees |
| Driving belt | Flat belt | Flat belt | Flat belt | Flat belt | Timing belt | Flat belt | Flat belt | Flat belt | Flat belt |
| Coupling material | Rubber | Rubber | Rubber | Rubber | Metal | Rubber | Rubber | Rubber | Rubber |
| Direct drive | — | — | — | — | — | — | — | — | — |
| Slitting speed (m/min) | 200 | 200 | 200 | 200 | 200 | 200 | 200 | 200 | 200 |
| Cycle f | 13.5 mm | 13.5 mm | 13.5 mm | 13.5 mm | 13.5 mm | 65 mm | 13.5 mm | 13.5 mm | 13.5 mm |
| Edge weave amount α | 2.5 μm | 2.5 μm | 2.5 μm | 2.5 μm | 3.0 μm | 1.5 μm | 2.5 μm | 2.5 μm | 2.5 μm |
| Winding tension | 0.40N | 0.40N | 0.40N | 0.40N | 0.40N | 0.40N | 0.25N | 0.10N | 0.40N |
| Water absorption amount | 0.40 g | 0.40 g | 0.40 g | 0.40 g | 0.40 g | 0.40 g | 0.50 g | 0.60 g | 0.40 g |
| Friction coefficient | 1.0 | 1.0 | 1.0 | 1.0 | 1.0 | 1.0 | 1.2 | 1.3 | 1.0 |

TABLE 1-6

|  | Comparative Example 10 | Comparative Example 11 | Comparative Example 12 | Comparative Example 13 | Comparative Example 14 | Comparative Example 15 |
|---|---|---|---|---|---|---|
| Type of ferromagnetic powder | BaFe | BaFe | BaFe | BaFe | BaFe | BaFe |
| Thickness of magnetic layer | 0.1 μm | 0.1 μm | 0.1 μm | 0.1 μm | 0.1 μm | 0.1 μm |
| Thickness of non-magnetic layer | 0.9 μm | 1.0 μm | 1.0 μm | 1.0 μm | 1.0 μm | 1.0 μm |
| Thickness of non-magnetic support | 3.8 μm | 4.0 μm | 4.0 μm | 4.0 μm | 4.0 μm | 4.0 μm |
| Thickness of back coating layer | 0.2 μm | 0.5 μm | 0.5 μm | 0.5 μm | 0.5 μm | 0.5 μm |
| Tape thickness | 5.0 μm | 5.6 μm | 5.6 μm | 5.6 μm | 5.6 μm | 5.6 μm |
| Type of non-magnetic support | PET | PET | PET | PET | PEN | PEN |
| Young's modulus of non-magnetic support Width direction (MPa) | 7000 | 7000 | 7000 | 4000 | 8000 | 8000 |
| Young's modulus of non-magnetic support Longitudinal direction direction (MPa) | 4000 | 4000 | 4000 | 7000 | 4000 | 4000 |
| Moisture content of non-magnetic support | 2.00% | 2.00% | 2.00% | 0.50% | 2.00% | 1.00% |
| Sucking section | No mesh | No mesh | Mesh | No mesh | No mesh | No mesh |
| Sucking pressure (×1000 Pa) | 1.33 | 1.33 | 13.3 | 1.33 | 1.33 | 1.33 |
| Winding angle | 188 degrees | 188 degrees | 188 degrees | 188 degrees | 188 degrees | 188 degrees |
| Driving belt | Flat belt | Flat belt | Flat belt | Flat belt | Flat belt | Flat belt |
| Coupling material | Rubber | Rubber | Rubber | Rubber | Rubber | Rubber |
| Direct drive | — | — | — | — | — | — |

TABLE 1-6-continued

|  | Comparative Example 10 | Comparative Example 11 | Comparative Example 12 | Comparative Example 13 | Comparative Example 14 | Comparative Example 15 |
|---|---|---|---|---|---|---|
| Slitting speed (m/min) | 200 | 200 | 200 | 200 | 200 | 200 |
| Cycle f | 13.5 mm | 13.5 mm | 65.0 mm | 13.5 mm | 13.5 mm | 13.5 mm |
| Edge weave amount α | 2.5 μm | 2.5 μm | 1.5 μm | 2.5 μm | 2.5 μm | 2.5 μm |
| Winding tension | 0.40N | 1.00N | 0.40N | 0.40N | 0.40N | 0.40N |
| Water absorption amount | 0.40 g | 0.40 g | 0.40 g | 0.40 g | 0.40 g | 0.40 g |
| Friction coefficient | 1.0 | 0.9 | 1.0 | 0.9 | 1.0 | 1.0 |

As shown in Table 1, the friction coefficient obtained in Examples was smaller than the friction coefficient obtained in Comparative Examples. From the result, it can be confirmed that the magnetic tape cartridge of Examples is a magnetic tape cartridge comprising a magnetic tape having excellent friction characteristics in a state of being exposed to environmental change from a high temperature and high humidity environment to an environment with lower temperature and humidity within a short period of time.

One embodiment of the present invention is effective in data storage applications.

What is claimed is:

1. A magnetic tape cartridge comprising:
a magnetic tape that is accommodated in the magnetic tape cartridge while being wound around a reel hub,
wherein a water absorption amount of the magnetic tape measured after the magnetic tape cartridge is stored in a storage environment with a temperature of 32° C. and a relative humidity of 80% for 10 days is more than 0 g and 0.30 g or less as a value in terms of a length of the magnetic tape of 1000 m,
the water absorption amount is a value measured in a measurement environment with a temperature of 21° C. and a relative humidity of 50% within 1 hour after the storage,
the magnetic tape comprises a non-magnetic support having a moisture content of 0% or more and 0.80% or less; and
the edge weave amount of the tape edge on at least one side of the magnetic tape is 0.1 μm or more and 1.5 μm or less.

2. The magnetic tape cartridge according to claim 1, wherein the water absorption amount is 0.10 g or more and 0.30 g or less.

3. The magnetic tape cartridge according to claim 1, wherein the magnetic tape has a non-magnetic support and a magnetic layer including a ferromagnetic powder, and
the non-magnetic support is a polyester support.

4. The magnetic tape cartridge according to claim 3, wherein the magnetic tape further has a non-magnetic layer including a non-magnetic powder between the non-magnetic support and the magnetic layer.

5. The magnetic tape cartridge according to claim 3, wherein the magnetic tape further has a back coating layer including a non-magnetic powder on a surface side of the non-magnetic support opposite to a surface side having the magnetic layer.

6. The magnetic tape cartridge according to claim 1, wherein a tape thickness of the magnetic tape is 5.6 μm or less.

7. The magnetic tape cartridge according to claim 1, wherein a tape thickness of the magnetic tape is 5.3 μm or less.

8. A magnetic tape apparatus comprising:
the magnetic tape cartridge according to claim 1.

9. The magnetic tape apparatus according to claim 8, wherein the water absorption amount is 0.10 g or more and 0.30 g or less.

10. The magnetic tape apparatus according to claim 8, wherein the magnetic tape has a non-magnetic support and a magnetic layer including a ferromagnetic powder, and
the non-magnetic support is a polyester support.

11. The magnetic tape apparatus according to claim 10, wherein the magnetic tape further has a non-magnetic layer including a non-magnetic powder between the non-magnetic support and the magnetic layer.

12. The magnetic tape apparatus according to claim 10, wherein the magnetic tape further has a back coating layer including a non-magnetic powder on a surface side of the non-magnetic support opposite to a surface side having the magnetic layer.

13. The magnetic tape apparatus according to claim 8, wherein a tape thickness of the magnetic tape is 5.6 μm or less.

14. The magnetic tape apparatus according to claim 8, wherein a tape thickness of the magnetic tape is 5.3 μm or less.

* * * * *